US011082938B2

(12) United States Patent
Agiwal et al.

(10) Patent No.: US 11,082,938 B2
(45) Date of Patent: Aug. 3, 2021

(54) METHOD AND SYSTEM FOR ACQUIRING HIGH FREQUENCY CARRIER IN A WIRELESS COMMUNICATION NETWORK

(71) Applicant: Samsung Electronics Co., Ltd., Gyeonggi-do (KR)

(72) Inventors: Anil Agiwal, Bangalore (IN); Anshuman Nigam, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 133 days.

(21) Appl. No.: 15/474,602

(22) Filed: Mar. 30, 2017

(65) Prior Publication Data

US 2017/0208561 A1 Jul. 20, 2017

Related U.S. Application Data

(63) Continuation of application No. 14/262,474, filed on Apr. 25, 2014, now Pat. No. 10,292,123.

(30) Foreign Application Priority Data

Apr. 25, 2013 (IN) .......................... 1815/CHE/2013
Apr. 15, 2014 (IN) .......................... 1815/CHE/2013

(51) Int. Cl.
*H04W 56/00* (2009.01)
*H04L 5/00* (2006.01)
(Continued)

(52) U.S. Cl.
CPC ......... *H04W 56/0015* (2013.01); *C08J 11/08* (2013.01); *H04B 7/066* (2013.01);
(Continued)

(58) Field of Classification Search
CPC ........... H04W 56/001; H04W 72/0446; H04W 24/02; H04W 56/0015; H04W 88/10;
(Continued)

(56) References Cited

U.S. PATENT DOCUMENTS 6,665,296 B1 12/2003 Sturza et al.
7,430,418 B2 9/2008 Kang et al.
(Continued)

FOREIGN PATENT DOCUMENTS

KR 20050025077 A 3/2005
KR 20120016099 A 2/2012
WO 2012165904 A2 12/2012

OTHER PUBLICATIONS

United States Office Action from related counterpart U.S. Appl. No. 14/262,474 dated Jun. 2, 2017; 40 pages.
(Continued)

*Primary Examiner* — Ricky Q Ngo
*Assistant Examiner* — Michael K Phillips

(57) ABSTRACT

A method and system for acquiring mmWave carrier in a wireless communication network is disclosed. In one embodiment, an MS acquires a low frequency carrier and then acquires the high frequency carrier. Since the low frequency carrier and the high frequency carrier are transmitted by same BS, the BS provides assistance information on the acquired low frequency carrier to the MS to acquire a synchronization signal which is transmitted on a high frequency carrier using beamforming. The assistance information includes synchronization signal beam time slots, synchronization signal beams which the MS needs to search, beam ID and so on. Based on the assistance information, the MS monitors the high frequency carrier to search and acquire the synchronization beam signal transmitted on the high frequency carrier. The MS determines the beam ID of the received synchronization beam signal and reports to the BS on the low frequency carrier.

24 Claims, 21 Drawing Sheets

(51) Int. Cl.
| | |
|---|---|
| *H04L 27/26* | (2006.01) |
| *H04B 7/06* | (2006.01) |
| *H04B 7/08* | (2006.01) |
| *C08J 11/08* | (2006.01) |
| *H04W 24/02* | (2009.01) |
| *H04W 88/06* | (2009.01) |
| *H04W 72/04* | (2009.01) |

(52) U.S. Cl.
CPC .......... *H04B 7/0617* (2013.01); *H04B 7/086* (2013.01); *H04L 5/001* (2013.01); *H04L 5/0091* (2013.01); *H04L 27/2692* (2013.01); *H04W 24/02* (2013.01); *H04W 56/001* (2013.01); *H04L 5/0048* (2013.01); *H04W 72/0446* (2013.01); *H04W 88/06* (2013.01); *Y02W 30/62* (2015.05)

(58) Field of Classification Search
CPC ...... H04W 88/06; H04L 5/0048; H04L 5/001; H04L 5/0091; H04L 27/2692; H04B 7/0617; H04B 7/086
See application file for complete search history.

(56) References Cited

U.S. PATENT DOCUMENTS

| | | |
|---|---|---|
| 8,054,802 B2 | 11/2011 | Burgess et al. |
| 8,095,069 B2 | 1/2012 | Maltsev et al. |
| 2005/0101326 A1 | 5/2005 | Kang et al. |
| 2009/0111468 A1 | 4/2009 | Burgess et al. |
| 2009/0232023 A1 | 9/2009 | Soffer et al. |
| 2010/0135238 A1 | 6/2010 | Sadri et al. |
| 2010/0157955 A1 | 6/2010 | Liu et al. |
| 2010/0265924 A1 | 10/2010 | Yong et al. |
| 2010/0273428 A1 | 10/2010 | Kimura et al. |
| 2011/0065448 A1 | 3/2011 | Song et al. |
| 2011/0149842 A1 | 6/2011 | Cordeiro |
| 2011/0182174 A1 | 7/2011 | Pi et al. |
| 2011/0199918 A1 | 8/2011 | Sampath et al. |
| 2011/0211490 A1 | 9/2011 | Nikula et al. |
| 2012/0039330 A1 | 2/2012 | Baldemair et al. |
| 2012/0052795 A1 | 3/2012 | Shen et al. |
| 2012/0057524 A1 | 3/2012 | Yu et al. |
| 2012/0122392 A1 | 5/2012 | Morioka et al. |
| 2012/0243638 A1 | 9/2012 | Maltsev et al. |
| 2012/0307726 A1 | 12/2012 | Pi et al. |
| 2012/0320874 A1 | 12/2012 | Li et al. |
| 2013/0064239 A1 | 3/2013 | Yu et al. |
| 2013/0065622 A1 | 3/2013 | Hwang |
| 2013/0077554 A1 | 3/2013 | Gauvreau et al. |
| 2013/0143502 A1 | 6/2013 | Kazmi et al. |
| 2013/0343338 A1 | 12/2013 | Campos et al. |
| 2014/0016632 A1 | 1/2014 | Takano et al. |
| 2014/0073337 A1* | 3/2014 | Hong ............... H04W 16/28 455/452.1 |
| 2014/0206406 A1 | 7/2014 | Cordeiro et al. |
| 2014/0321282 A1* | 10/2014 | Pragada ............. H04W 28/10 370/235 |
| 2015/0004918 A1* | 1/2015 | Wang ................. H04W 88/02 455/73 |
| 2015/0085838 A1 | 3/2015 | Benjebbour et al. |
| 2015/0230263 A1 | 8/2015 | Roy et al. |
| 2015/0333894 A1 | 11/2015 | Wang et al. |
| 2015/0373623 A1 | 12/2015 | Takano |
| 2015/0373655 A1 | 12/2015 | Takano |
| 2016/0006529 A1* | 1/2016 | Yl ......................... H04J 11/005 370/329 |
| 2016/0007371 A1* | 1/2016 | Pietraski ........... H04W 72/1289 370/315 |
| 2016/0044711 A1 | 2/2016 | Lou et al. |

OTHER PUBLICATIONS

Pi, Z., et al., "An Introduction to Millimeter-Wave Mobile Broadband Systems," IEEE Communications Magazine, Topics in Radio Communications, Jun. 2011, pp. 101-107.

Foreign Communication From a Related Counterpart Application, European Application No. 14788405.0, Extended European Search Report dated Oct. 21, 2016, 9 pages.

Foreign Communication From a Related Counterpart Application, PCT Application No. PCT/KR2014/003648, International Search Report dated Aug. 7, 2014, 3 pages.

Foreign Communication From a Related Counterpart Application, PCT Application No. PCT/KR2014/003648, International Search Report dated Aug. 7, 2014, 5 pages.

USPTO, Non-final Office Action for U.S. Appl. No. 14/262,474, dated May 29, 2018, 48 pages.

USPTO, Final Office Action for U.S. Appl. No. 14/262,474 dated Sep. 18, 2018, 88 pages.

Huawei, HiSilicon, "PSS/SSS configurations for additional carrier types", 3GPP TSG RAN WG1 meeting #68bis, Mar. 26-30, 2012, R1-120973, 3 pages.

Office Action dated Sep. 26, 2020 in connection with Korean Patent Application No. 10-2014-0049830, 7 pages.

Decision of Grant dated Mar. 25, 2021 in connection with Korean Application No. 10-2014-0049830, 6 pages.

Ericsson, et al., "Heterogeneous deployments with NCT," R1-131446, 3GPP TSG-RAN WG1 #72bis, Chicago, USA, Apr. 15-19, 2013, 5 pages.

Samsung, "PSS/SSS Details on NCT cells," R1-124931, 3GPP TSG RAN WG1 Meeting #71, New Orleans, USA, Nov. 12-16, 2012, 7 pages.

\* cited by examiner

METHOD AND SYSTEM FOR ACQUIRING HIGH FREQUENCY CARRIER IN A WIRELESS COMMUNICATION NETWORK

CROSS-REFERENCE TO RELATED APPLICATION(S) AND CLAIM OF PRIORITY

The present application is related to and claims priority under 35 U.S.C. § 119(a) to U.S. patent application Ser. No. 14/262,474 which was filed with the United States Patent and Trademark Office on Apr. 25, 2014, Indian Provisional Application No. 1815/CHE/2013 which was filed with the Government of India, Controller General of Patents Designs and Trademarks on Apr. 25, 2013, and Indian Patent Application No. 1815/CHE/2013 which was filed with the Government of India, Controller General of Patents Designs and Trademarks on Apr. 15, 2014, the entire content of which is hereby incorporated by reference.

TECHNICAL FIELD

The present invention relates to the field of wireless communication systems, and more particularly relates to method and system for acquiring high frequency carrier in a wireless communication network.

BACKGROUND

In the recent years several broadband wireless technologies have been developed to meet the growing number of broadband subscribers and to provide more and better applications and services. The 3rd Generation Partnership Project 2 (3GPP2) developed Code Division Multiple Access 2000 (CDMA 2000), 1× Evolution Data Optimized (1× EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there can be an increasing need for a mobile communication system with large capacity, high throughput, lower latency, and better reliability.

SUMMARY

To address the above-discussed needs, it is a primary object to provide a system and method for acquiring a high frequency carrier in a communication network. A first example of a method of acquiring a high frequency carrier in a communication network is disclosed herein. The method includes receiving second carrier acquisition information, wherein the acquisition information comprises at least one of information about one or more synchronization signal beams being transmitted in each sector of a base station (BS), time interval information of a second carrier in which the synchronization signal beams are transmitted by the BS, synchronization signal beam information of the one or more synchronization signal beams being transmitted by the BS in each of an indicated time interval, information about the one or more synchronization signal beams to be monitored by the mobile station (MS) and information about the one or more time intervals to be monitored by the MS, wherein the second carrier acquisition information is received by the MS from the BS on a first carrier, determining the one or more synchronization signal beams for monitoring by the MS amongst a plurality of synchronization signal beams transmitted on the second carrier, determining the time intervals by the MS when the determined synchronization signal beams are being transmitted on the second carrier, and monitoring the second carrier at the determined time intervals by the MS to search and acquire the synchronization signal transmitted on the second carrier.

A second example of a method of acquiring a high frequency carrier in a communication network is disclosed herein. The method includes transmitting by a base station (BS) second carrier acquisition information wherein the acquisition information comprises at least one of information about one or more synchronization signal beams being transmitted in each sector of the BS, time interval information of a second carrier in which synchronization signal beams are being transmitted by BS, synchronization signal beam information of one or more synchronization signal beams being transmitted by the BS in each of an indicated time interval, information about the one or more synchronization signal beams to be monitored by a mobile station (MS) and information about the one or more time intervals to be monitored by the MS, wherein the second carrier acquisition information is transmitted by the BS on a first carrier.

A third example of a system for acquiring a high frequency carrier in a communication network is disclosed herein. The system includes a mobile station (MS) configured to receive second carrier acquisition information comprising at least one of information about one or more synchronization signal beams being transmitted in each sector of a base station (BS), time interval information of a second carrier in which the synchronization signal beams are being transmitted by the BS, synchronization signal beam information of the one or more synchronization signal beams being transmitted by the BS in each of an indicated time interval, information about the one or more synchronization signal beams to be monitored by the MS and information about the one or more time intervals to be monitored by the MS, wherein the second carrier acquisition information is received by the MS from the BS on a first carrier. The MS is also configured to determine the one or more synchronization signal beams for monitoring amongst a plurality of synchronization signal beams transmitted on the second carrier. The MS is further configured to determine the time intervals when the determined synchronization signal beams are transmitted on the second carrier. The MS is configured to monitor the second carrier at the determined time intervals to search and acquire the synchronization signal transmitted on the second carrier.

A fourth example of a system for acquiring a high frequency carrier in a communication network is disclosed herein. The system includes a base station (BS) configured to transmit second carrier acquisition information comprising at least one of information about one or more synchronization signal beams being transmitted in each sector of the BS, time interval information of a second carrier in which synchronization signal beams are being transmitted by the BS, synchronization signal beam information of one or more synchronization signal beams being transmitted by the BS in each of an indicated time interval, information about the one or more synchronization signal beams to be monitored by a mobile station (MS) and information about the one or more time intervals to be monitored by the MS, wherein the second carrier acquisition information is transmitted by the BS on a first carrier.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
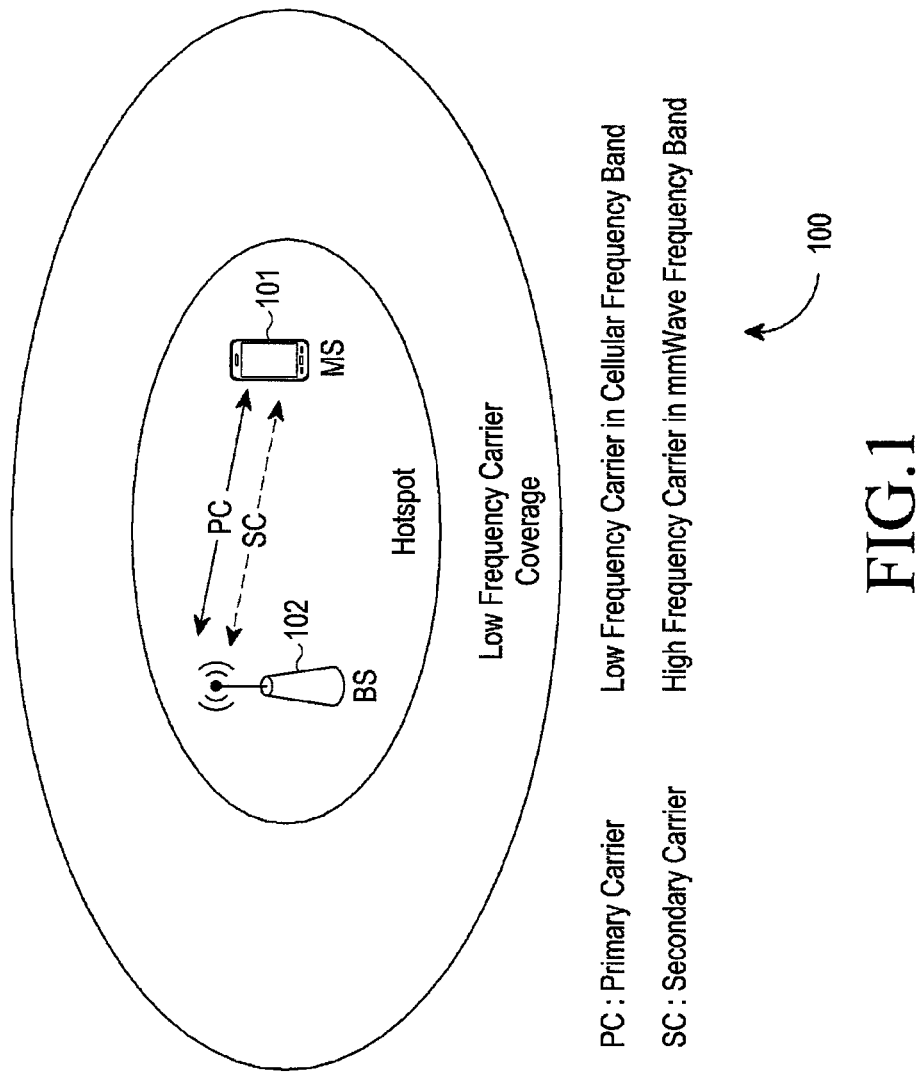
FIG. 1 is an example schematic representation of an asymmetric multiband multicarrier system according to this disclosure.

FIGS. 1-15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Super Mobile Broadband (SMB) system based on millimetre waves such as radio waves with wavelength in the range of 1 millimeter (mm) to 10 mm, which can correspond to a radio frequency of 30 Gigahertz (GHz) to 300 GHz, can be a candidate for next generation mobile communication technology as vast amount of spectrum is available in mmWave band. An SMB network as introduced in paper titled "An introduction to Millimetre-Wave Broadband Systems" authored by Zhouyue Pi and Farooq Khan which is hereby incorporated by reference into this patent document in its entirety can consist of multiple SMB base stations (BSs) that cover a geographic area. In order to ensure good coverage, SMB base stations can be deployed with higher density than macro-cellular base stations. In general, roughly the same site-to-site distance as microcell or Picocell deployment in an urban environment can be recommended. The transmission and/or reception in an SMB system can be based on narrow beams, which can suppress the interference from neighbouring SMB base stations and can extend the range of an SMB link. However due to high path loss, heavy shadowing and rain attenuation reliable transmission at higher frequencies can be one of the key issues that need to be overcome in order to make the millimetre wave systems a practical reality.

The lower frequencies in cellular band having robust link characteristics can be utilized together with higher frequencies in mmWave band to overcome the reliability issues in the SMB systems. In an asymmetric multiband multicarrier SMB network wherein the mobile station (MS) communicates with the communication network using asymmetric multiband carriers comprising at least one low frequency carrier in cellular band and at least one high frequency carrier in the mmWave band. The primary carrier such as a carrier operating on low frequencies and the secondary/extended carrier such as a carrier operating on high frequencies can be transmitted by the same base station as illustrated in FIG. 1. The base station can broadcast necessary information for identifying, acquiring, and registering with the base station on the low frequency carrier. The high frequency with large bandwidth can be used primarily for providing the high data rates services to the mobile users. Since the coverage of low frequency carrier and high frequency carrier can be quite different, the MS may have to search and acquire the high frequency carrier even if the MS has acquired the low frequency carrier and has registered with the base station.

In a standalone system, the BS can communicate with MS using only a high frequency carrier. At higher frequency, the propagation path loss can be higher and hence a propagation distance can be shorter. Beamforming techniques can be used to decrease the propagation path loss and to increase the propagation distance for communication at a higher frequency. Beamforming can be classified into Transmission (TX) beamforming performed in a transmitting end and reception (RX) beamforming performed in a receiving end. In general, the TX beamforming can increase directivity by allowing an area in which propagation reaches to be densely located in a specific direction by using a plurality of antennas. In this situation, aggregation of the plurality of antennas can be referred to as an antenna array, and each antenna included in the array can be referred to as an array element.

The antenna array can be configured in various forms such as a linear array, a planar array, and the like. The use of the TX beamforming can result in the increase in the directivity of a signal, thereby increasing a propagation distance. Further, since the signal is almost not transmitted in a direction other than a directivity direction, a signal interference acting on another receiving end can be significantly decreased. The receiving end can perform beamforming on a RX signal by using a RX antenna array. The RX beamforming can increase the RX signal strength transmitted in a specific direction by allowing propagation to be concentrated in a specific direction, and can exclude a signal transmitted in a direction other than the specific direction from the RX signal, thereby providing an effect of blocking an interference signal.

The BS can transmit a synchronization signal through a Synchronization Channel (SCH) which can assist an MS to detect the presence of a base station (BS). The BS can also transmit the broadcast signal through a Broadcast Channel (BCH). The BCH can carry essential system information which can enable the MS to have initial communication with the BS. The SCH & BCH can be transmitted repetitively by performing beamforming on the channels with different transmission beams wherein each TX beam transmits the SCH and BCH in different directions. Because of hardware limitation (such as one antenna array is needed for one beam direction) the TX beams in different directions can be transmitted at different times. The MS can use receive beamforming to detect the synchronization signal. MS can use multiple RX beams to detect the SCH transmission using multiple TX beams. Consider for example, SCH & BCH can be transmitted using 4 TX beams and MS can use 4 RX beams to search the SCH & BCH. 4 TX beams can be transmitted in four different time durations (such as slots) in a sub frame on the high frequency carrier as illustrated in FIG. 1.

Figure 2A:
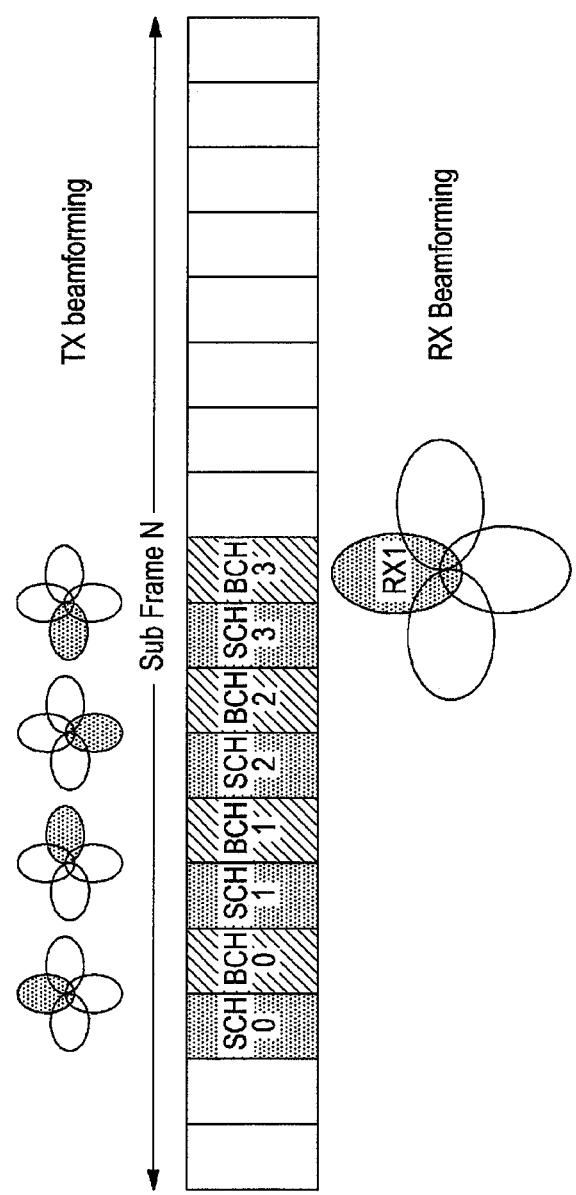
FIGS. 2A to 2D are examples schematic representations of Synchronization Channel (SCH)/Broadcast Channel (BCH) transmission and reception using beam forming in a standalone high frequency carrier system according to this disclosure.
Figure 2B:
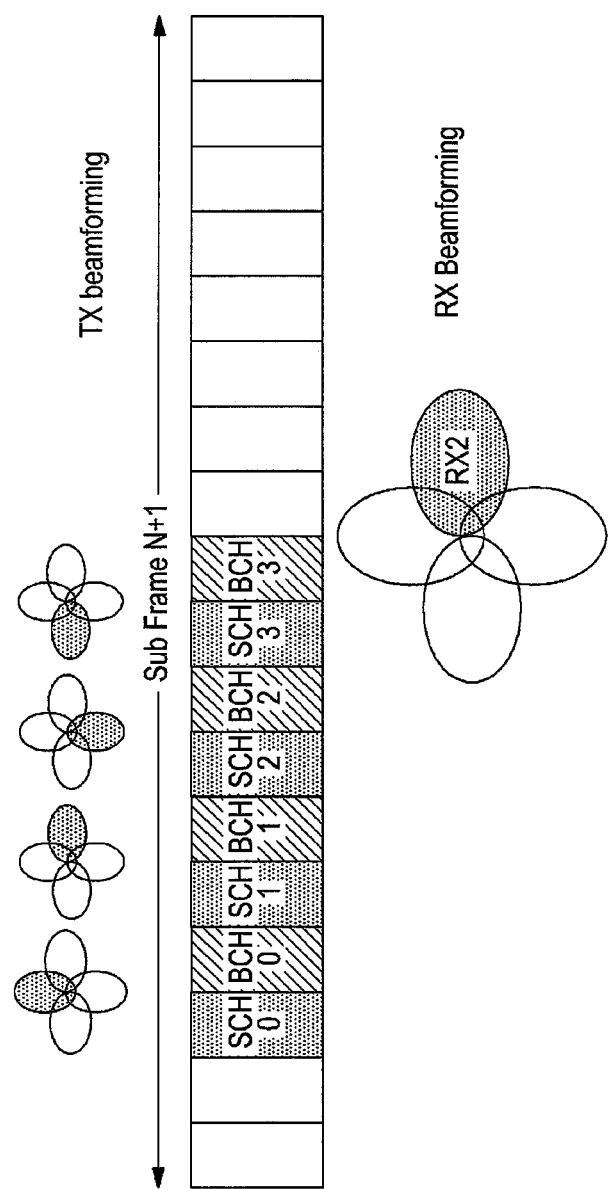
Figure 2C:
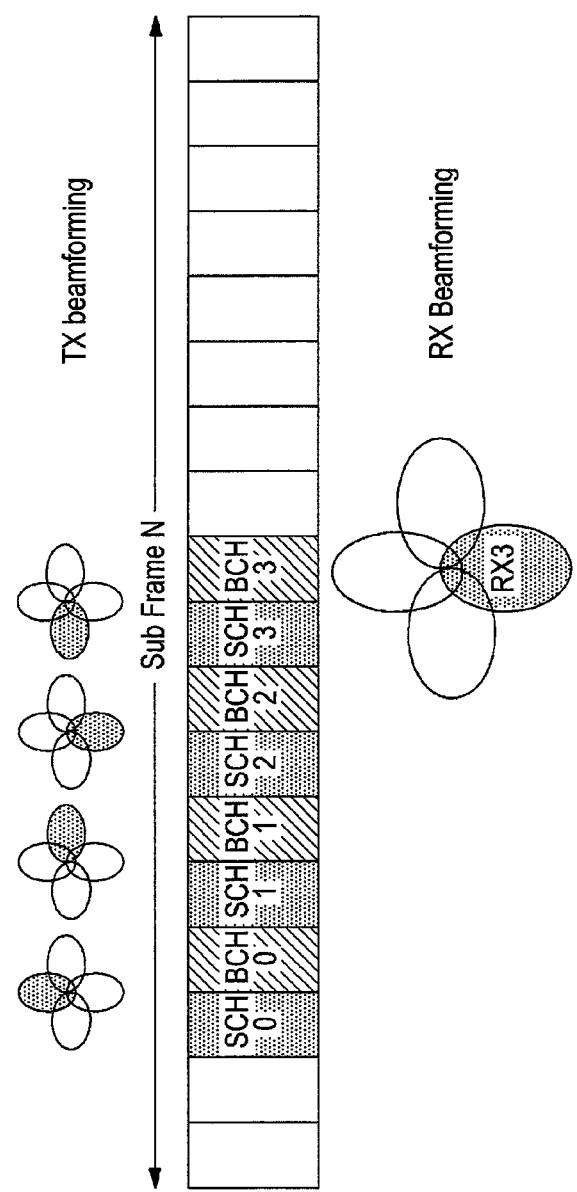
Figure 2D:
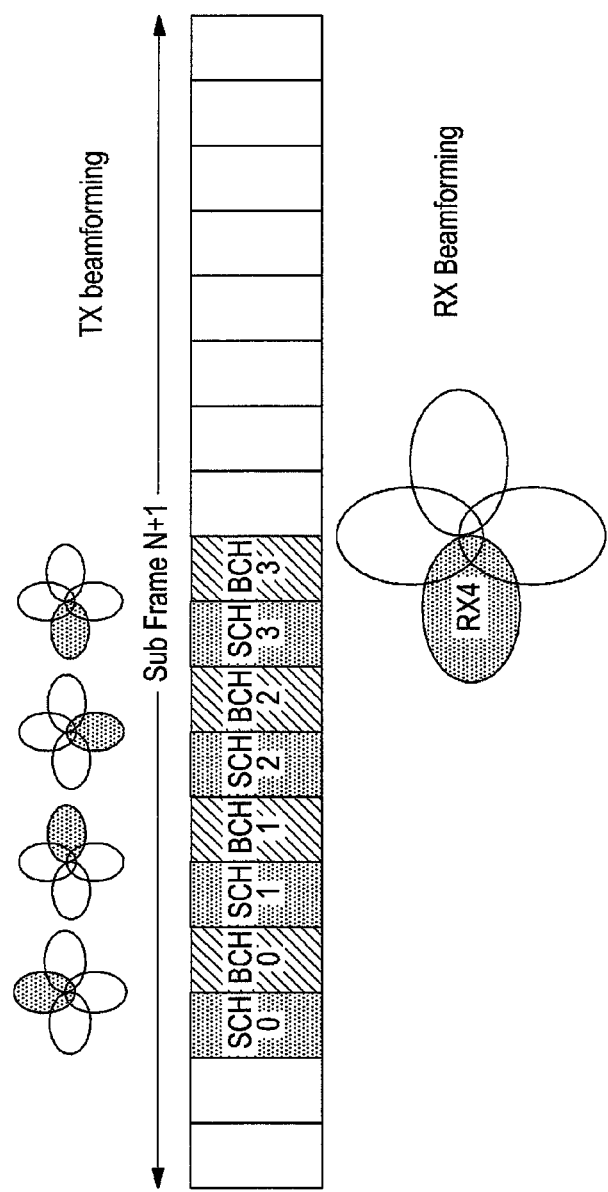

The MS can first configure the receiver antenna array to receive using first Rx beam Rx 1. The MS can receive and search for SCH for one sub frame duration using first Rx beam Rx1 as illustrated in FIG. 2A. The MS then can configure the receiver antenna array to receive using second Rx beam Rx2 as illustrated in FIG. 2B. The MS can receive and search for SCH for one sub frame duration using second Rx beam Rx2. The same procedure can be repeated for Rx beam 3 and Rx beam 4 as illustrated in FIG. 2C and FIG. 2D. Based on the reception in four sub frames, the MS can determine the best TX and RX beam pair. During the initial acquisition of high frequency carrier, the MS may not be synchronized with the transmissions of the base station and hence may have to continuously process the received signals to detect the SCH. The MS may also have to determine the TX beam ID in order to report the best TX beam to the BS. The TX beam ID can be indicated in the synchronization signal transmitted in SCH by scrambling the synchronizing signal with different scrambling code for different TX beams. This can increase the processing effort by four times for the MS as the MS has to descramble the received synchronization signal using four scrambling codes. Alternately the TX beam ID can be indicated as an information element in the system information carried in BCH or by using the different scrambling code for different TX beam transmitting the BCH. In this case after detecting the SCH, MS can receive the BCH to determine the TX beam ID. This method can also increase the processing effort for the MS as the MS can receive and decode the BCH.

In a system wherein the BS can communicate with the MS using low frequency carrier and high frequency carrier, the method of acquiring the high frequency carrier as used in standalone system can be inefficient as explained above.

Therefore, there can be a need of method and system for acquiring a high frequency carrier in a wireless communication network in order to overcome the limitation as discussed.

A method and system of acquiring a high frequency carrier (such as a millimeter (mm) Wave carrier) in a wireless communication network in which a base station communicates with a mobile station in the wireless communication network using asymmetric multiband carriers including at least one low frequency carrier in a cellular band and at least one high frequency carrier in a mmWave band is disclosed herein.

FIG. 1 is an example schematic representation of an asymmetric multiband multicarrier system 100 according to this disclosure. In an asymmetric multiband multicarrier SMB network where a mobile station (MS) 101 communicates with a wireless communication network using asymmetric multiband carriers can comprise at least one low frequency carrier in cellular band and at least one high frequency carrier in the mmWave band, the primary carrier such as a carrier operating on low frequencies and the secondary/extended carrier such as a carrier operating on high frequencies can be transmitted by the same base station (BS) 102. The base station 102 can broadcast necessary information for identifying, acquiring and registering with the base station 102 on the low frequency carrier. The high frequency with large bandwidth can be used primarily for providing the high data rates services to the mobile users. Since the coverage of low frequency carrier and high frequency carrier can be quite different the MS 101 may have to search and acquire the high frequency carrier even if the MS 101 has acquired the low frequency carrier and has registered with the base station 102.

Figure 3A:
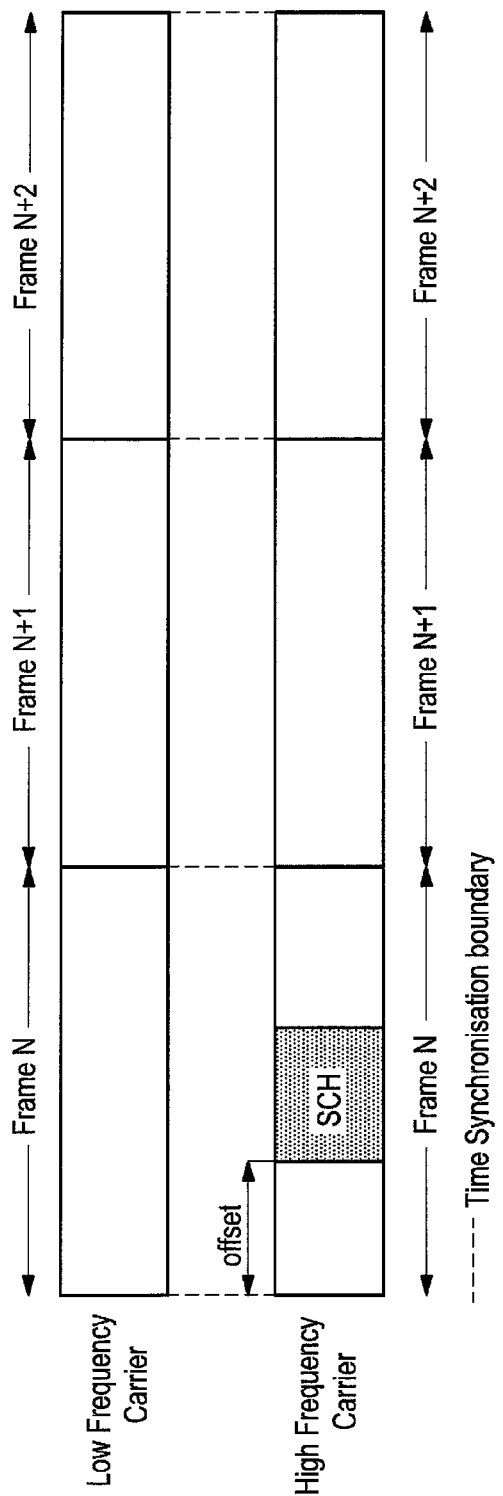
FIG. 3A-3C are examples timing diagrams depicting timing synchronization between a low frequency and a high frequency carrier in the asymmetric multiband multicarrier system according to this disclosure.
Figure 3B:
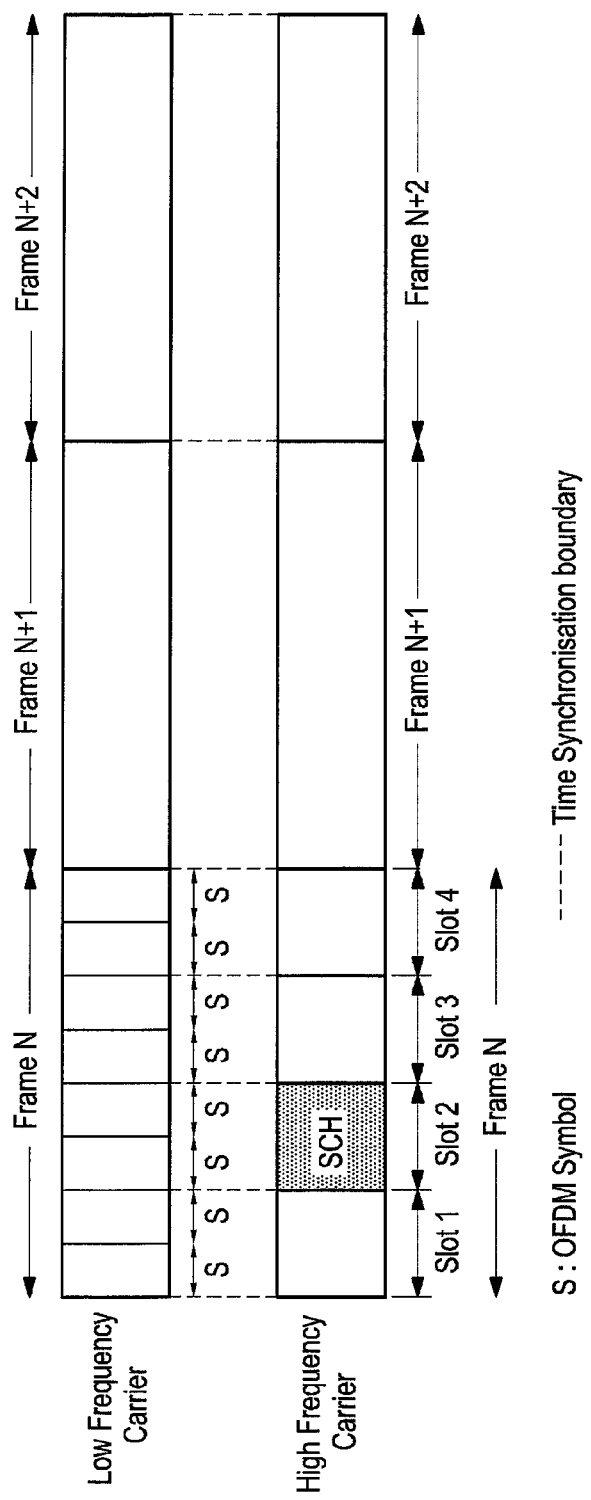
Figure 3C:
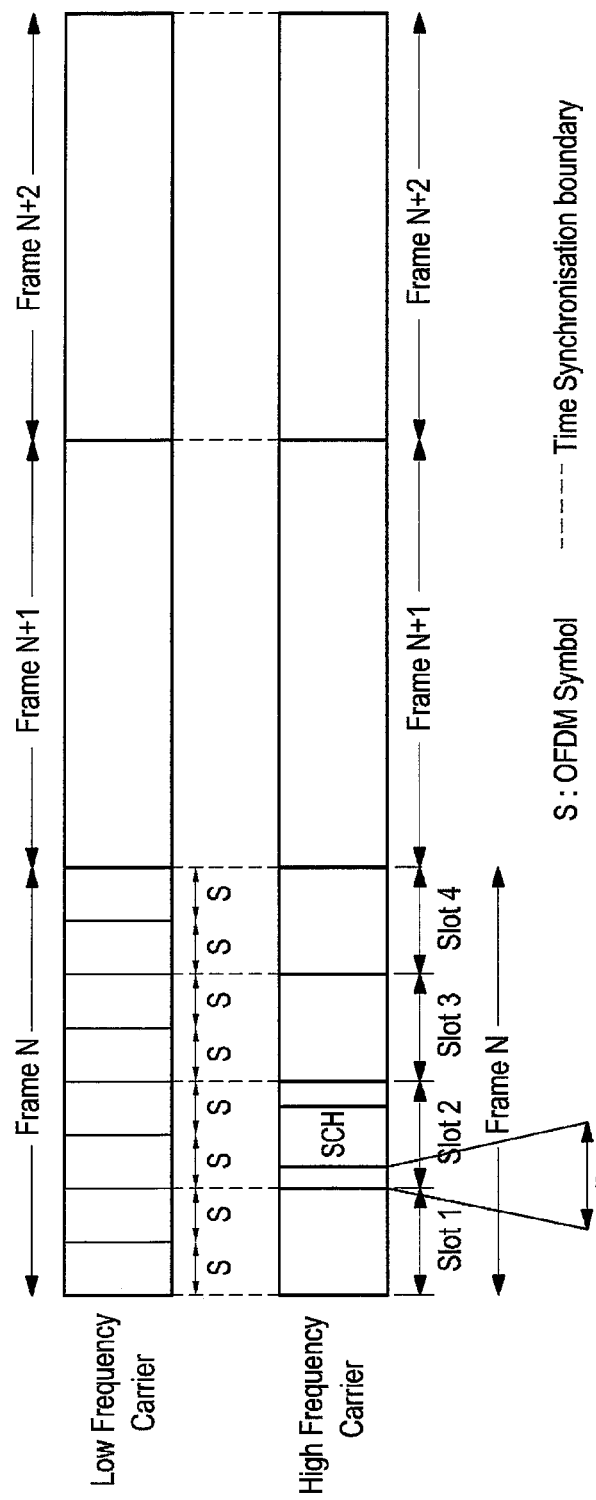

In one embodiment, the low frequency carrier (which also can be referred to as 4G carrier or first carrier) and high frequency carrier (which also can be referred to as 5G carrier or second carrier in the disclosure) can be transmitted in a time synchronized manner. Consider for example that the transmission on a low frequency carrier can be divided into fixed time intervals (or frames) wherein each time interval is of one millisecond. Each frame can carry multiple OFDM symbols in case of OFDM based transmission on the low frequency carrier. The transmission on high frequency carrier can also be divided into fixed time intervals (or frames) wherein each time interval is of one millisecond. The time intervals on low frequency carrier and high frequency carrier can be different in different embodiments or systems. Each frame on the high frequency carrier can be further divided into slots wherein each slot carries one or more OFDM symbols in case of OFDM based transmission on the high frequency carrier. In an embodiment, the frames of low frequency carrier and high frequency carrier can be time synchronized as illustrated in FIG. 3A. In at least this embodiment, the location of the synchronization signal transmitted in a frame of high frequency carrier can be determined using the 'offset' value from the start of the frame. Alternately, the OFDM symbol in the low frequency carrier can be synchronized with the slots in the high frequency carrier as illustrated in FIG. 3B. In at least this embodiment, if the SCH occupies the entire slot, the location of SCH can be determined using the OFDM symbol duration. For example SCH transmitted in slot 2 of high frequency carrier can be 2 OFDM symbols away from the start of frame in low frequency carrier. Alternately if SCH occupies few OFDM symbols in slot 2 then OFDM duration+offset can be used to determine the location of SCH as illustrated in FIG. 3C.

As disclosed herein, the MS can first acquire the low frequency carrier and then can acquire the high frequency carrier as and when needed. Since the low frequency carrier and high frequency carrier can be transmitted by the same BS, the BS can assist the MS which has acquired the low frequency carrier and is registered with the BS. The BS can assist the MS to acquire the high frequency carrier or 5G carrier as follows:

In an embodiment, the base station can inform the MS about the time intervals in which the synchronization signal is transmitted on the high frequency carrier. The synchronization signal can be transmitted using beamforming in multiple directions wherein one or more beam transmissions are separated in time. The base station can transmit this information to the MS on the low frequency carrier. This information can be broadcasted or sent in a unicast manner to the MS. In an embodiment, the synchronization signal beam transmission time intervals on high frequency carrier can be fixed in the system. In this case BS may not inform the MS about the time intervals in which the synchronization signal beam is transmitted on the high frequency carrier. The BS can also inform the MS about the timing of synchronization signal beam transmission on high frequency carrier with respect to timing on low frequency carrier. The information about the time intervals for synchronization signal beam transmission can reduce the time the MS has to monitor the high frequency carrier.

In an embodiment, the base station can also inform the MS about the ID of the synchronization signal beam transmitted in each of the indicated time intervals. Multiple synchronization signal beams can be transmitted depending on TX beamforming capability of the BS. In case multiple synchronization signal beams are transmitted at same time, the scrambling code or beam sequence used to distinguish the multiple beams can also be informed to the MS. The BS can transmit this information to the MS on the low frequency carrier. In an embodiment, there can be a fixed mapping between the beam IDs and time intervals in which the synchronization signal beam is transmitted. For example, if four synchronization signal beams are transmitted in slot 1, slot 2, slot 3 and slot4, the beam ID for synchronization signal beam in slot 1 can be Beam ID1, the beam ID for synchronization signal beam in slot 2 can be Beam ID2, the beam ID for synchronization signal beam in slot 3 can be Beam ID3 and the beam ID for synchronization signal beam in slot 4 can be Beam ID4. In another example, if two synchronization signal beams are transmitted in slot 1 and two synchronization signal beams are transmitted in slot 2 then beams in slot 1 can have beam ID1 and beam ID2 while beams in slot 2 can have beam ID 3 and Beam ID 4. Scrambling codes or beam sequences can be used to distinguish between two beams and beam IDs in a slot. For example, scrambling code 1 or beam sequence 1 can correspond to Beam ID1 and scrambling code 2 or beam sequence 2 can correspond to Beam ID2. The information about the synchronization signal beam IDs can eliminate the need for the MS to read BCH information to determine the Beam ID. It can also eliminate the need for the MS to identify beam ID by descrambling the code used to transmit the synchronization signal beam.

In an embodiment, the BS can inform the MS about the beams to be searched by it amongst the plurality of synchronization signal beams transmitted by the BS. This information can be transmitted by the BS on the low frequency carrier. The information about the specific beams to be searched by the MS amongst the plurality of synchronization signal beams can be determined as follows: The coverage of low frequency carrier transmitted by the BS can be divided into multiple sectors. Each of these sectors can have different cell IDs or can have the same cell IDs. Each of the plurality of synchronization signal beams transmitted on high frequency carrier can be mapped to one of these sectors. Consider for example that there can be six synchronization signal beams transmitted on the high frequency carrier. Synchronization signal beam 1 and beam 2 can be transmitted in an area covered by sector 1, synchronization signal beam 3 and beam 4 can be transmitted in an area covered by sector 2, and synchronization signal beam 5 and beam 6 can be transmitted in an area covered by sector 3.

In an embodiment, when or after the MS acquires the low frequency carrier and registers with the BS, both the BS and MS can be aware of the sector to which the MS is attached. Since the MS can be attached on a specific sector, the MS can search only for the synchronization signal beams transmitted in the sector. In an embodiment, the BS can transmit (broadcasts or unicast) information about the sectors and beam IDs in each sector. The MS can then determine the synchronization signal beams it has to search. In an embodiment, BS can determine the synchronization signal beams the MS has to search based on the sector to which MS is attached. The BS can then inform the MS about the beams to be searched by it amongst the plurality of synchronization signal beams on a low frequency carrier.

In an embodiment, the BS can determine a sector location of the MS based on the antenna from which BS receives MS transmissions on a low frequency carrier. Each sector can have different antenna for reception. In an embodiment, the BS cam determine the synchronization signal beams the MS has to search based on the determined sector location of the MS using the receive antenna. The BS can then inform the MS about the beams to be searched by it amongst the plurality of synchronization signal beams on the low frequency carrier.

In addition to synchronization signal beams of sector to which the MS is attached, some synchronization signal beams of neighboring sector can also be monitored by the MS. The BS can inform these on the low frequency carrier to the MS.

The term "low frequency carrier", "first carrier", and "4G carrier" can be used interchangeably throughout this disclosure. In an embodiment, the term "high frequency carrier", "second carrier", and "5G carrier" can also be used interchangeably throughout this disclosure.

Figure 4A:
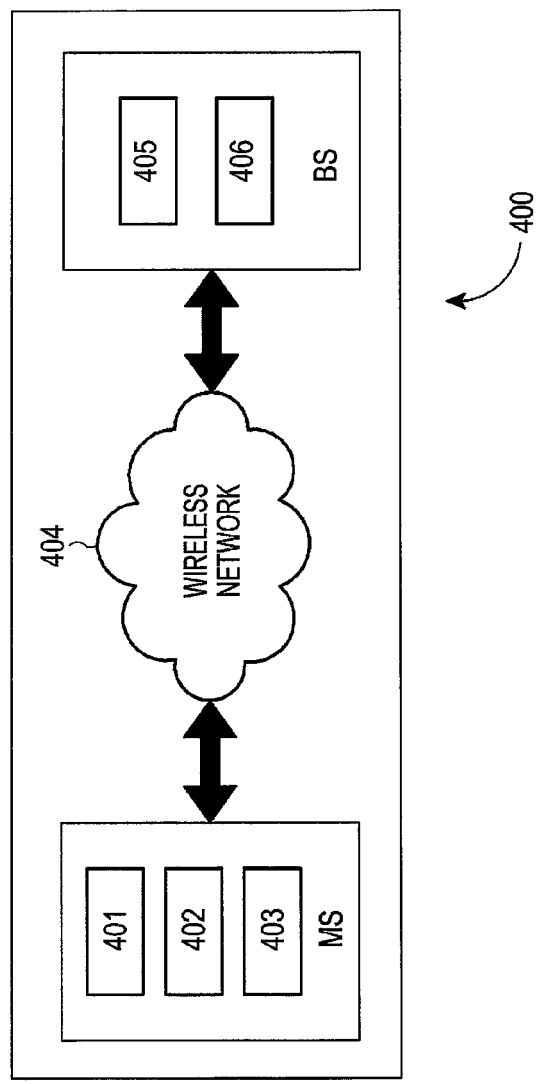
FIG. 4A is an example system for acquiring a high frequency carrier in a communication network according to this disclosure.

FIG. 4A is an example block diagram of a system 400 for acquiring a high frequency carrier in a communication network according to this disclosure. The system 400 can include at least one mobile station (MS) and at least one base station (B S). The at least one MS and the at least one BS can be coupled to each other through a communication network 404. The MS can include, but is not limited to, a low frequency transceiver (Tx/Rx) module 401, a high frequency receiver (Rx) module 402, and a high frequency acquisition module 403. The BS can include, but is not limited to, a low frequency transceiver (Tx/Rx) module 405, and a high frequency transceiver (Tx/Rx) module 406.

Figure 4B:
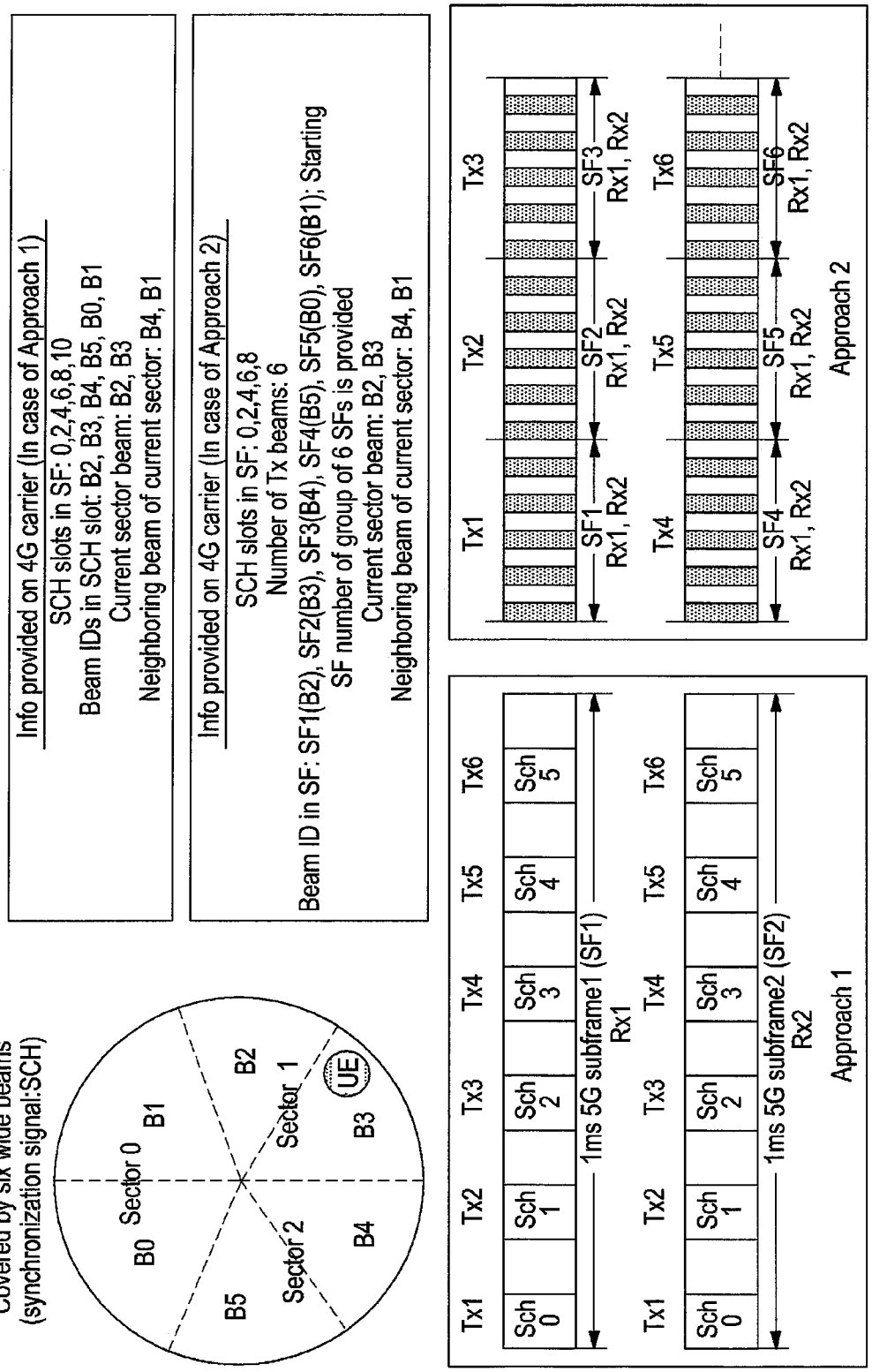
FIG. 4B is an example schematic representation depicting information transmitted by a Base station (BS) to assist a Mobile station (MS) for searching and acquiring a high frequency carrier according to this disclosure.

FIG. 4B is an example in which information being transmitted by BS can assist the acquisition of a high frequency carrier depending on how the synchronization signal is transmitted by the BS. The MS can be in coverage of the BS and can be attached to Sector 1 of the BS. The BS coverage can be divided into three sectors. There can be at least two methods followed by the BS for transmitting the synchronization signal on a high frequency carrier. In a first method, a BS can transmit all the beams of a synchronization signal in one sub frame of a high frequency carrier. Each beam can be transmitted in different slots of a sub frame. These steps can be repeated for other sub frames. In at least the first method, the MS can first configure the first RX beam RX1 and can search for synchronization signal beams in sub frame 1 and then the MS can configure the second RX beam RX2 and can search for synchronization signal beams in sub frame 2. In order to assist the MS in searching the synchronization signal, BS can provide one or more of the following information to MS:

SCH slots in SF: 0, 2, 4, 6, 8, 10
Beam IDs in SCH slot: B2, B3, B4, B5, B0, B1
Current sector beam: B2, B3
Neighbouring beam of current sector: B4, B1

In a method, a BS can transmit one synchronization signal beam in one sub frame. Multiple transmissions of same synchronization signal beam can be done in one sub frame. In at least the second method, the MS can use both the RX beam RX1 and RX beam RX2 one after another in each sub frame to search for synchronization signal. In order to assist the MS in searching the synchronization signal, the BS can provide one or more of the following information to MS:

SCH slots in SF: 0, 2, 4, 6, 8
Number of TX beams: 6
Beam ID in SF: SF1 (B2), SF2(B3), SF3(B4), SF4(B5), SF5(B0), SF6(B1); Starting SF number of group of 6 SFs is provided
Current sector beam: B2, B3
Neighbouring beam of current sector: B4, B1

Figure 5:
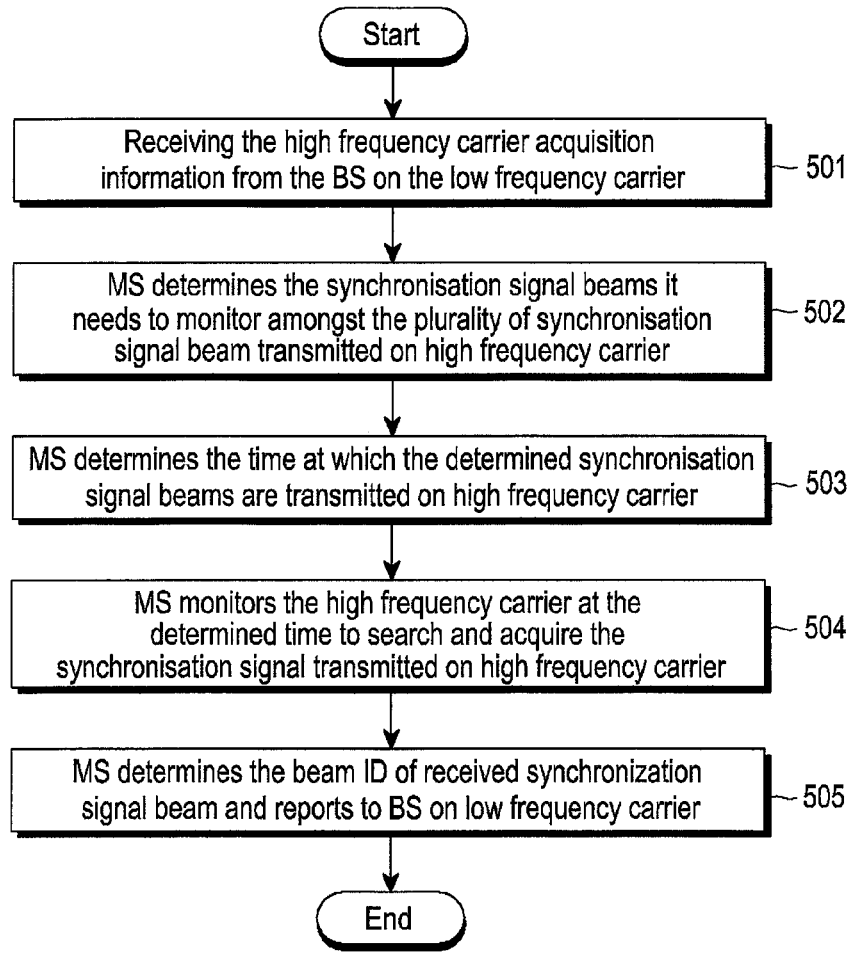
FIG. 5 is an example flow diagram of a method of acquiring a high frequency carrier in a communication network according to this disclosure.

FIG. 5 is an example flow diagram of a method of searching and acquiring a high frequency carrier in a communication network according to this disclosure. An MS can receive a trigger from a BS to search and acquire the synchronization signal transmitted on the high frequency carrier or the MS can decide on its own to search and acquire the synchronization signal transmitted on the high frequency carrier. In step 501, the MS can receive the high frequency carrier acquisition information from the BS on the low frequency carrier. The received high frequency carrier acquisition information can include at least one of information about one or more synchronization signal beams being transmitted in each sector of the BS, time interval information of a high frequency carrier in which the synchronization signal beams are being transmitted by the BS, synchronization signal beam information of the one or more synchronization signal beams being transmitted by the BS in each of an indicated time interval, information about the one or more synchronization signal beams to be monitored by the MS, and information about the one or more time intervals to be monitored by the MS. The synchronization signal beam information can include at least one of a beam identifier and beam sequence corresponding to a beam. The high frequency carrier acquisition information can include information to acquire the high frequency carrier of the BS to which the MS is attached or to acquire the high frequency carrier of a neighbour BS or both. The high frequency carrier acquisition information can be broadcasted by the BS. Alternately the high frequency carrier acquisition information can be sent by the BS in dedicated signalling.

In step 502, the MS can determine the synchronization signal beams it needs to monitor amongst the plurality of synchronization signal beam transmitted on the high frequency carrier. The MS can monitor all the synchronization signal beams transmitted by the BS. The MS can monitor some of the synchronization signal beams transmitted on the high frequency carrier. The MS can determine the one or more synchronization signal beams corresponding to the sector on which the MS is attached with the BS using the received high frequency carrier acquisition information comprising information about the one or more synchronization signal beams being transmitted in each sector of BS. In an embodiment, the MS can monitor the synchronization signal beams indicated in the received second carrier acquisition information for MS monitoring. The received synchronization signal beams information for MS monitoring in the high frequency carrier acquisition information can be determined by the BS based on the sector to which the MS is attached.

In step 503, the MS can determine the time intervals on the high frequency carrier where the determined synchronization signal beams is transmitted. In an embodiment, the time intervals of synchronisation signal beam transmission and mapping between time intervals and synchronisation signal beams can be transmitted by the BS in high frequency carrier acquisition information. The time intervals corresponding to the determined synchronization signal beams can be determined using the received high frequency carrier acquisition information comprising of time interval information of the second carrier in which the synchronization signal beams being transmitted by the BS and the synchronization signal beam information of one or more synchronization signal beams being transmitted by the BS in each of an indicated time interval. In an embodiment, the time intervals of synchronisation signal beam transmission can be pre-defined and mapping between pre-defined time intervals and synchronisation signal beams can be transmitted by BS in high frequency carrier acquisition information. The time intervals corresponding to the determined synchronization signal beams can be determined using the received high frequency carrier acquisition information including synchronization signal beam information of one or more synchronization signal beams being transmitted by the BS in each of predefined time interval for synchronization signal beam transmission on the second carrier. In an embodiment, the time intervals of synchronisation signal beam transmission and mapping between time intervals and synchronisation signal beams can be predefined. The time intervals corresponding to the determined synchronization signal beams can be determined using the predefined time intervals for synchronization signal beam transmission and the pre-defined mapping between one or more synchronization signal beams and the time interval for synchronization signal beam transmission. In an embodiment, the MS can monitor the time intervals indicated in the received second carrier acquisition information for MS monitoring. The received time interval information for MS monitoring in the high frequency carrier acquisition information can be determined by the BS based on the sector to which the MS is attached.

In step 504, the MS can monitor the high frequency carrier at the determined time intervals to search and acquire the synchronization signal transmitted on the high frequency carrier.

In step 505, beam ID of the acquired synchronization signal beam can be determined. The beam ID of the successfully received synchronization signal beam can be determined based on at least one of the time intervals in which the synchronization signal beam is received and the beam sequence. The synchronization signal beam information comprising at least one of beam ID and beam sequence of the successfully received one or more synchronization signal beams can also be reported by the MS to the BS on the low frequency carrier.

Figure 6:
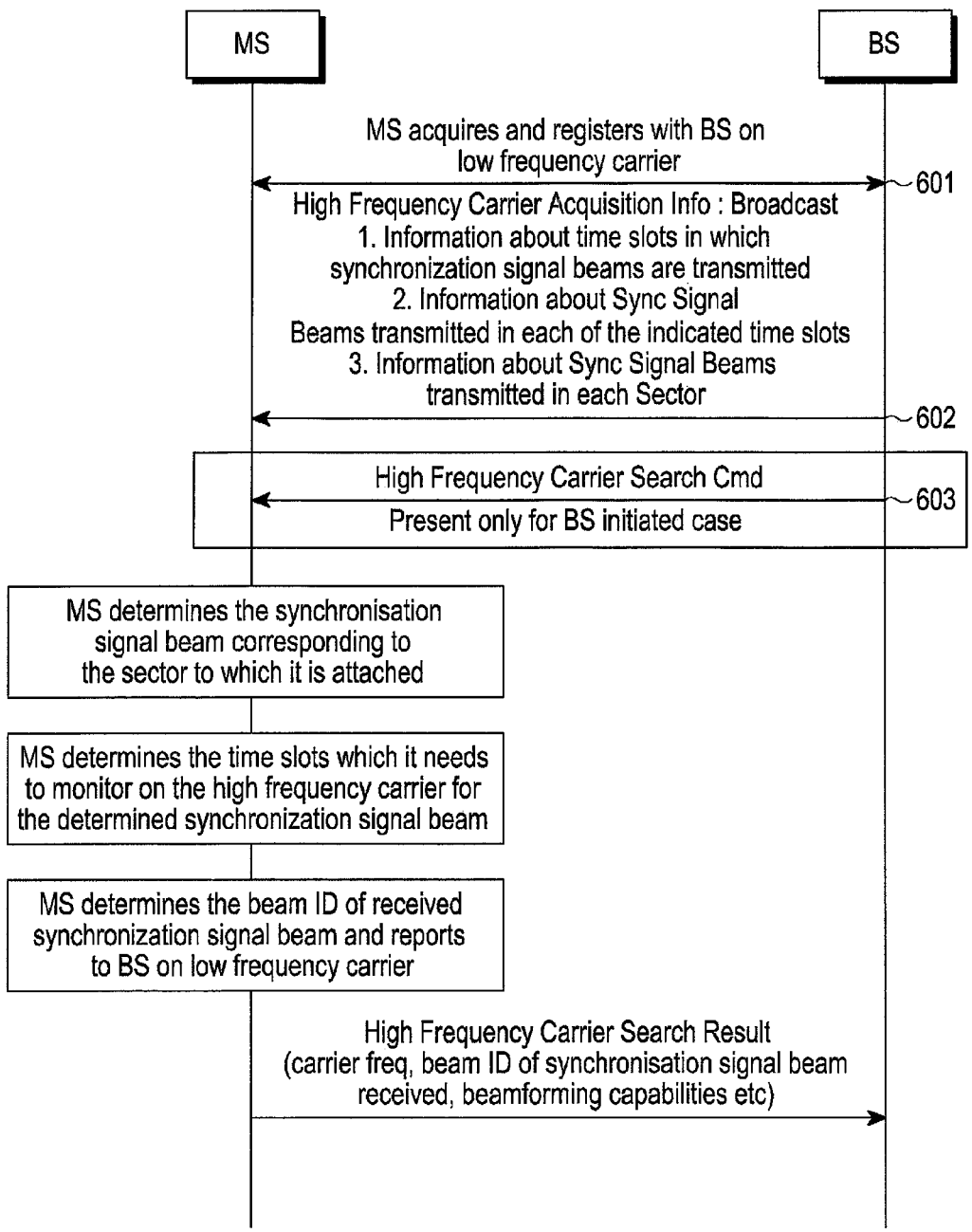
FIG. 6 is an example flow diagram of a method of acquiring high frequency carrier in a communication network when a Base station (BS) broadcasts information associated with synchronization signal beams transmitted in each sector according to this disclosure.

FIG. 6 is an example flow diagram of a method of searching and acquiring a high frequency carrier according to this disclosure.

The MS can acquire and register with the BS on a low frequency carrier at step 601. The BS can then broadcast high frequency carrier acquisition information to the MS on the acquired low frequency carrier at step 602. The information which is broadcasted can include, but is not limited to, time interval information of the high frequency carrier in which synchronization signal beams are being transmitted by the BS, synchronization signal beam information of one or more synchronization signal beams being transmitted by the BS in each of an indicated time interval, and information about the one or more synchronization signal beams being transmitted in each sector of the BS. The synchronization signal beam information can include at least one of a beam identifier and beam sequence corresponding to a beam.

Subsequently, the BS can send a high frequency carrier search command to the MS on the acquired low frequency carrier at step 603.

Figure 7:
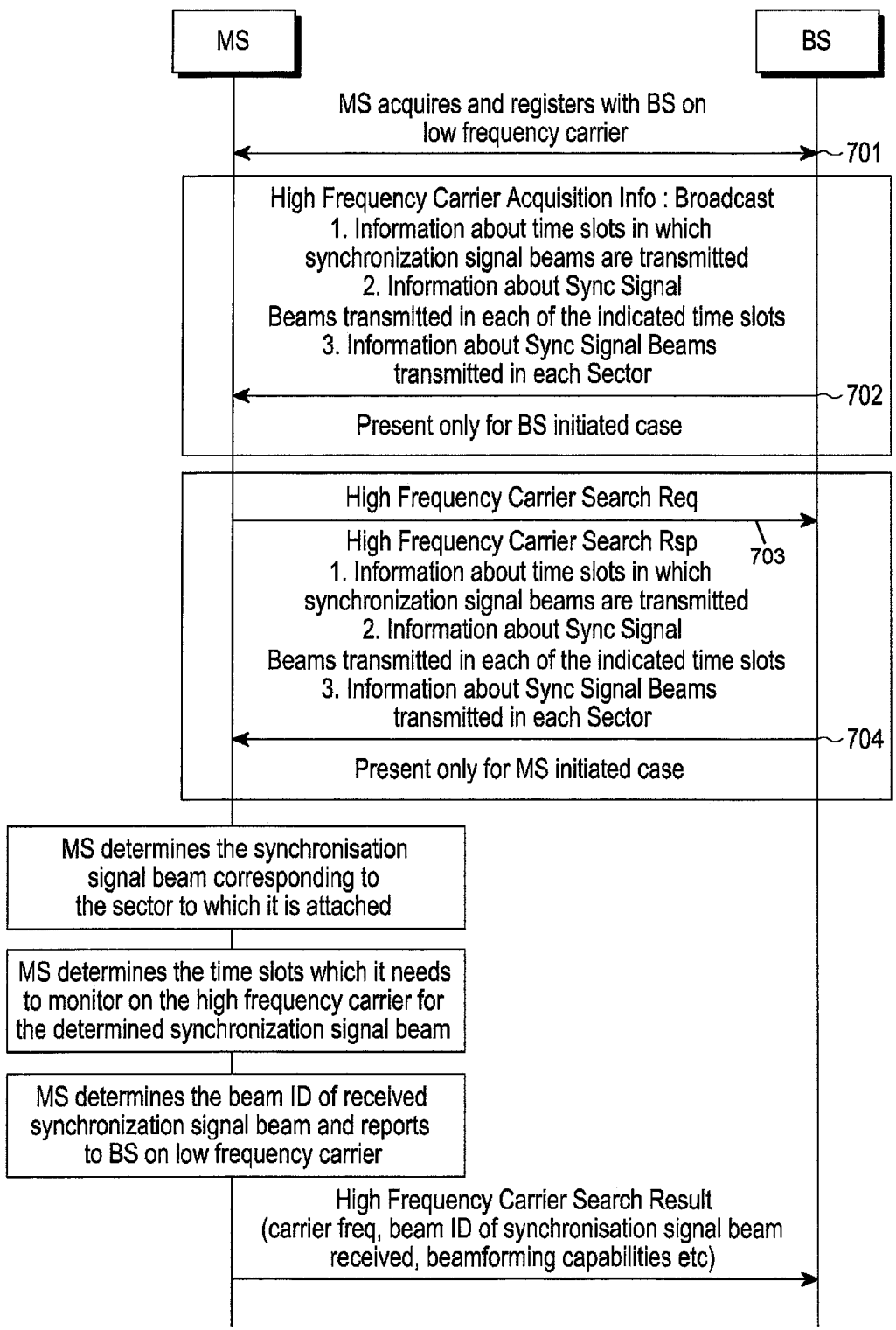
FIG. 7 is an example flow diagram of a method of acquiring a high frequency carrier in a communication network when a Base station (BS) unicasts information associated with synchronization signal beams transmitted in each sector according to this disclosure.

FIG. 7 is an example flow diagram of a method of searching and acquiring a high frequency carrier according to this disclosure.

In an embodiment, the MS can acquire and register with the BS on a low frequency carrier at step 701. The BS can then unicast a high frequency carrier search command to the MS at step 702. The search command can include, but is not limited to, time interval information of the high frequency carrier in which synchronization signal beams are being transmitted by the BS, synchronization signal beam information of one or more synchronization signal beams being transmitted by the BS in each of an indicated time interval, and information about the one or more synchronization signal beams being transmitted in each sector of the BS. The synchronization signal beam information can include at least one of a beam identifier and beam sequence corresponding to a beam.

In an embodiment, the MS can acquire and register with a BS on a low frequency carrier at step 701. The MS can then send a high frequency carrier search request to the BS at step 703. The BS can in return provide a high frequency carrier search response to the MS at step 704. The search response can include, but is not limited to, time interval information of the high frequency carrier in which synchronization signal beams are being transmitted by the BS, synchronization signal beam information of one or more synchronization signal beams being transmitted by the BS in each of an indicated time interval, and information about the one or more synchronization signal beams being transmitted in each sector of the BS. The synchronization signal beam information can include at least one of a beam identifier and beam sequence corresponding to a beam.

Figure 8:
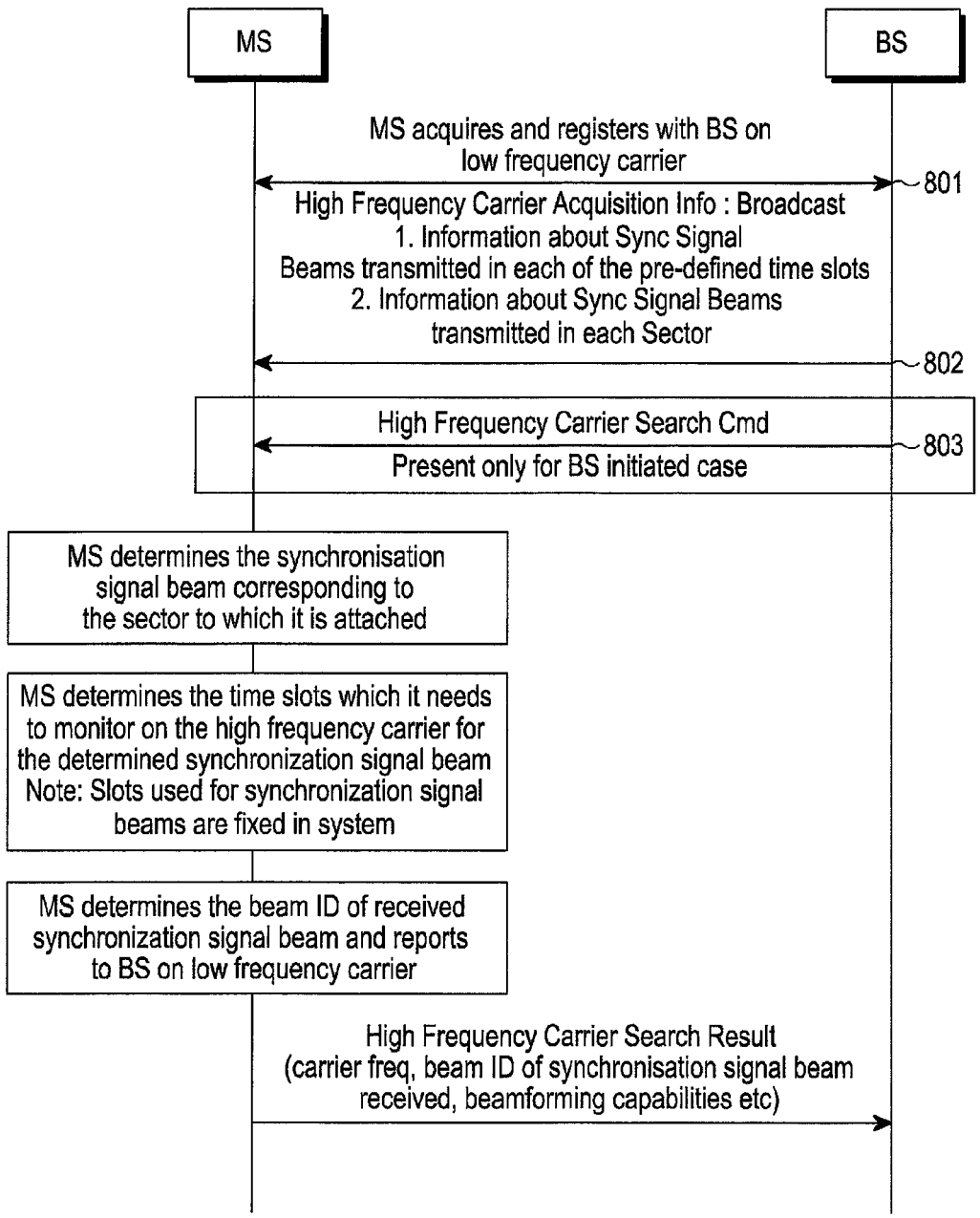
FIG. 8 is an example flow diagram of a method of acquiring a high frequency carrier in a communication network when a Base station (B S) broadcasts information regarding synchronization signal beams transmitted in each sector according to this disclosure.

FIG. 8 is an example flow diagram of a method of searching and acquiring a high frequency carrier in a communication network according to this disclosure where the time slots used for synchronization signal beams are fixed in the communication network.

In an embodiment, the MS can acquire and register with the BS on the low frequency carrier at step 801. The BS can then broadcast high frequency carrier acquisition information to the MS on the acquired low frequency carrier at step 802. The information can include but is not limited to, synchronization signal beam information of one or more synchronization signal beams being transmitted by the BS in the pre-defined time intervals for synchronization signal transmission and information about the one or more synchronization signal beams being transmitted in each sector of the BS. The synchronization signal beam information can include at least one of a beam identifier and beam sequence corresponding to a beam. Subsequently, the BS can send a high frequency carrier search command to the MS on the acquired low frequency carrier at step 803.

Figure 9:
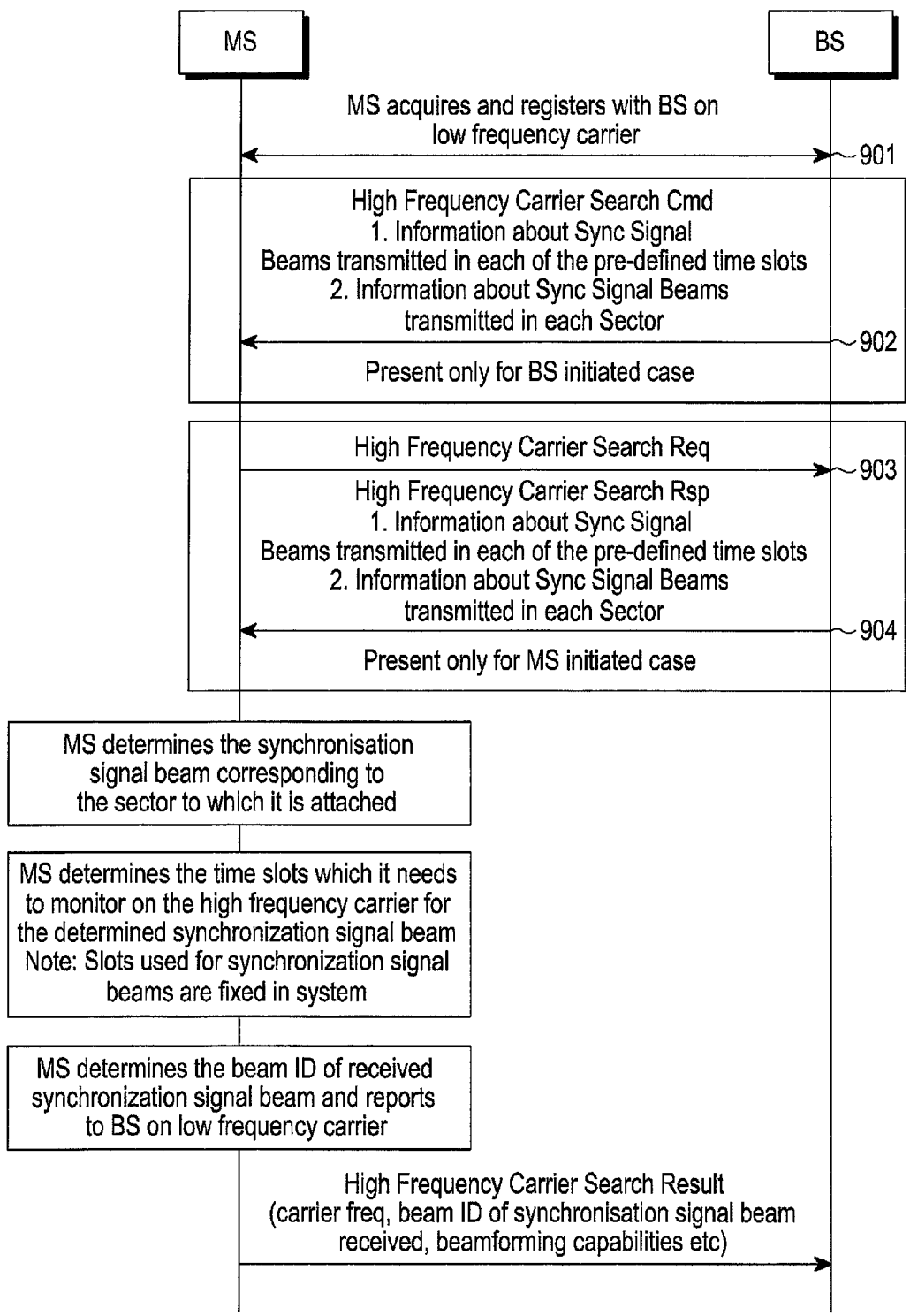
FIG. 9 is an example flow diagram of a method of acquiring a high frequency carrier in a communication network when a Base station (BS) unicasts information associated with synchronization signal beams transmitted in each sector according to this disclosure.

FIG. 9 is an example flow diagram of a method of searching and acquiring a high frequency carrier, according to this disclosure where the time slots used for synchronization signal beams are fixed in the communication network.

In an embodiment, the MS can acquire and register with the BS on the low frequency carrier at step 901. The BS can then send a high frequency carrier search command to the MS on the acquired low frequency carrier at step 902. The search command can include but is not limited to, synchronization signal beam information of one or more synchronization signal beams being transmitted by the BS in the pre defined time intervals for synchronization signal transmission and information about the one or more synchronization signal beams being transmitted in each sector of the BS. The synchronization signal beam information can include at least one of a beam identifier and beam sequence corresponding to a beam.

In an embodiment, the MS can acquire and register with the BS on the low frequency carrier at step 901. The MS can then send a high frequency carrier search request to the BS on the acquired low frequency carrier at step 903. Subsequently, the BS can provide a high frequency carrier search response to the MS on the acquired low frequency carrier at step 904. The search response can include, but is not limited to, synchronization signal beam information transmitted in each sector, and beam IDs of high frequency synchronization signal beams transmitted in each sector.

Figure 10:
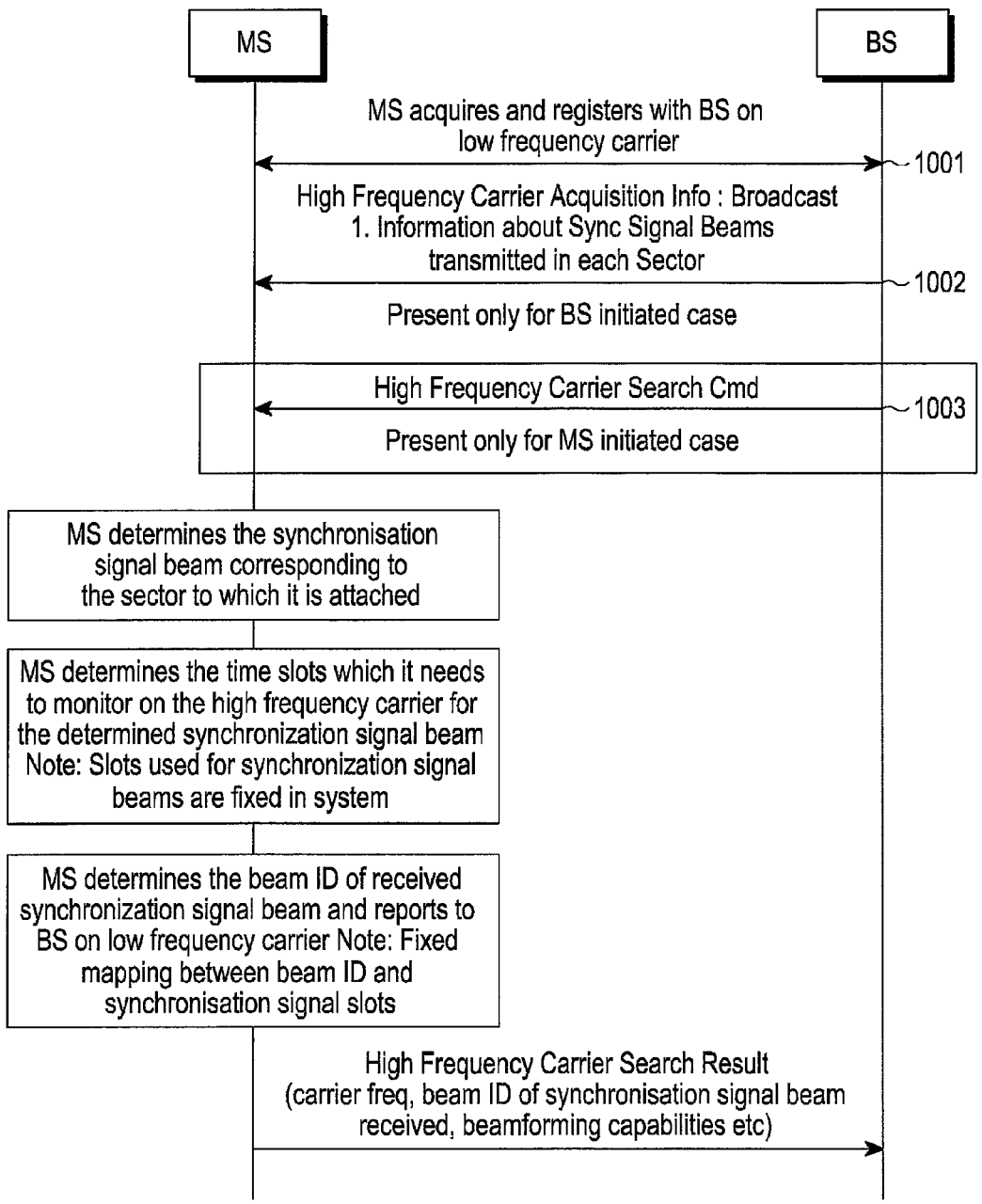
FIG. 10 is an example flow diagram of a method of acquiring a high frequency carrier in a communication network when a BS broadcasts information regarding synchronization signal beams transmitted in each sector according to this disclosure.

FIG. 10 is an example flow diagram of a method of searching and acquiring a high frequency carrier according to this disclosure where a fixed mapping is provided between the beam ID and the synchronization signal slots. In at least this embodiment, the time slots used for synchronization signal beams can also be fixed in the communication network.

In an embodiment, the MS can acquire and register with the BS on the low frequency carrier at step 1001. The BS can then broadcast high frequency carrier acquisition information to the MS on the acquired low frequency carrier at step 1002. The information can include, but is not limited to synchronization signal beam information transmitted in each sector.

In an embodiment, the BS can send a high frequency carrier search command to the MS on the acquired low frequency carrier at step 1003.

Figure 11:
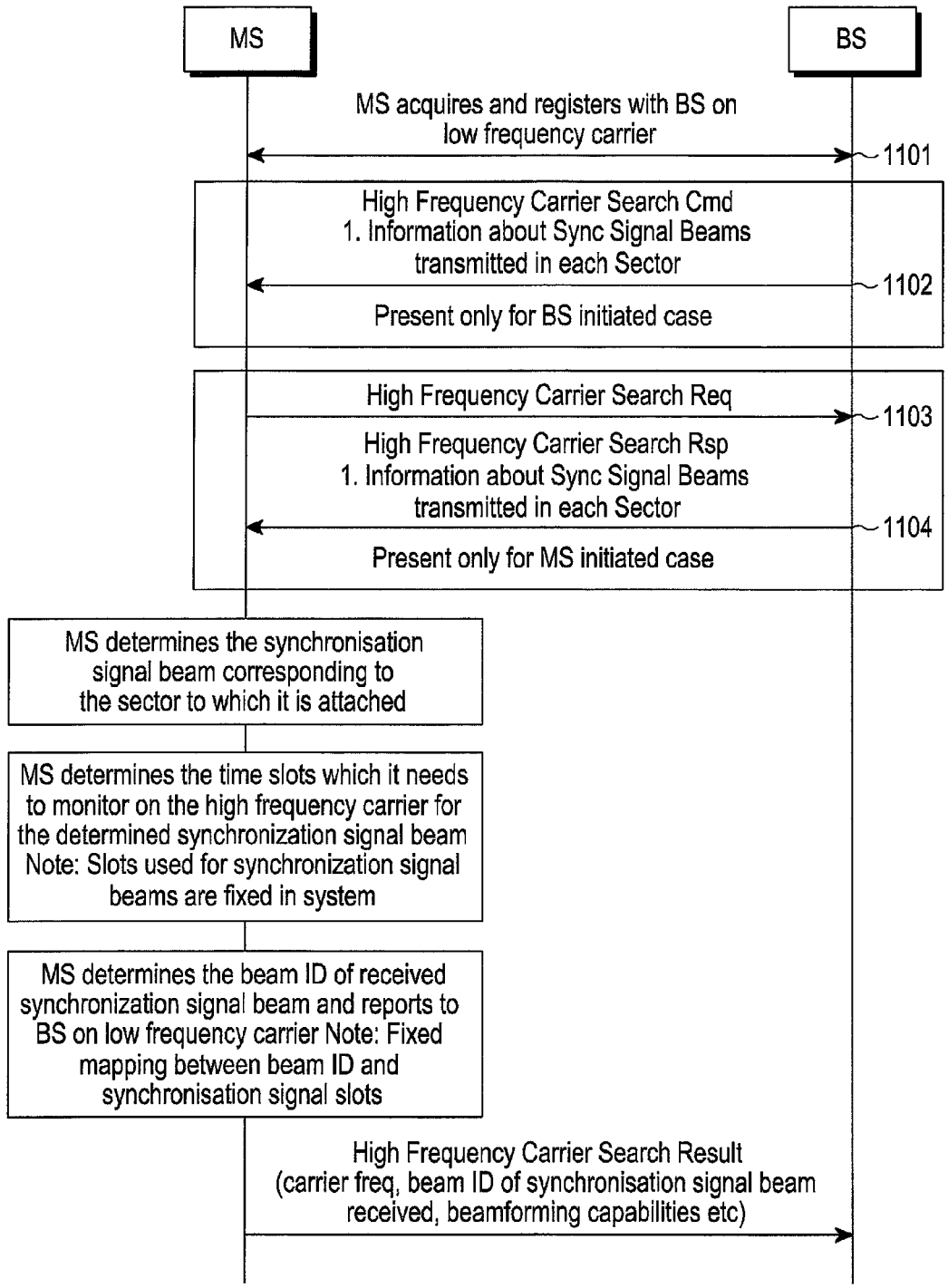
FIG. 11 is an example flow diagram of a method of acquiring a high frequency carrier in a communication network when a BS unicasts information associated with synchronization signal beams transmitted in each sector according to this disclosure.

FIG. 11 is an example flow diagram of a method of searching and acquiring a high frequency carrier according to this disclosure where a fixed mapping is provided between the beam ID and the synchronization signal slots. In at least this embodiment, the time slots used for synchronization signal beams can also be fixed in the communication network.

In an embodiment, the MS can acquire and register with the BS on the low frequency carrier at step 1101. The BS can then unicast a high frequency carrier search command to the MS on the acquired low frequency carrier at step 1102. The search command can include, but is not limited to, synchronization signal beam information transmitted in each sector.

In an embodiment, the MS can acquire and register with the BS on the low frequency carrier at step 1101. The MS can then send a high frequency carrier search request to the BS on the acquired low frequency carrier at step 1103. Subsequently, the BS can provide a high frequency carrier search response to the MS on the acquired low frequency carrier at step 1104. The search response can include but is not limited to, synchronization signal beam information transmitted in each sector.

Figure 12:
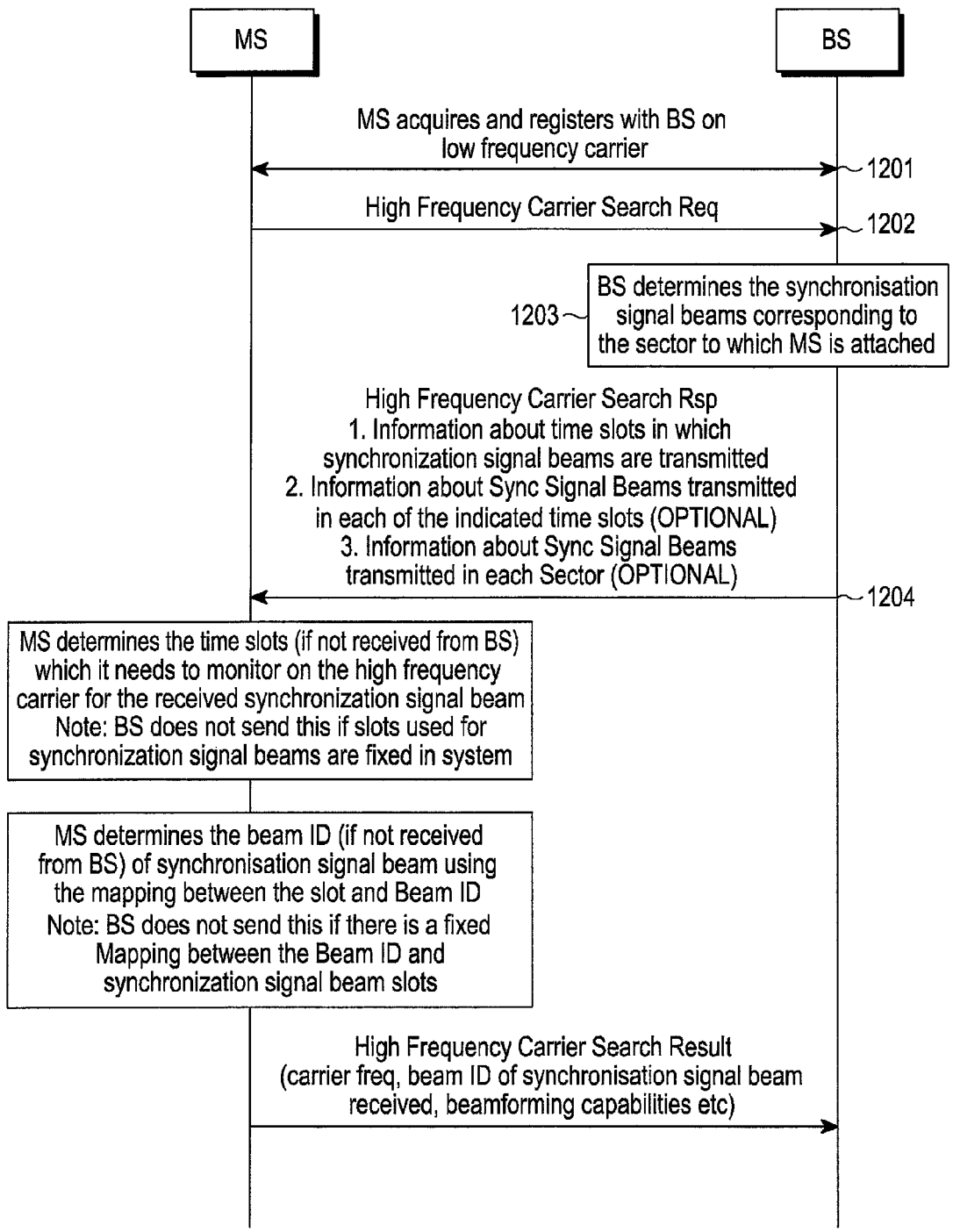
FIG. 12 is an example flow diagram of a method of acquiring a high frequency carrier in a communication network according to this disclosure.

FIG. 12 is an example flow diagram of a method of searching and acquiring a high frequency carrier in a communication network according to this disclosure. In at least this embodiment, the BS can determine time slots of the high frequency carrier during which the MS monitors the high frequency carrier for the synchronization signal beams. The time slots used for synchronization signal beams can be fixed in the communication network. The beam IDs of synchronization signal beams can be determined using the mapping between the time slot and beam ID. As illustrated in FIG. 12, the mapping can be fixed mapping.

In an embodiment, the MS can acquire and register with the BS on a low frequency carrier at step 1201. The MS can then send a high frequency carrier search request at step 1202. Subsequently, the BS can determine synchronization signal beams corresponding to a sector to which the MS is attached at step 1203. Later, the BS can send a high frequency carrier search response to the MS at step 1204. Here, the high frequency carrier search response can include synchronization signal beams to search and optionally beam ID and a time slot of a high frequency carrier that the MS needs to monitor for receiving synchronization signal beams.

Figure 13:
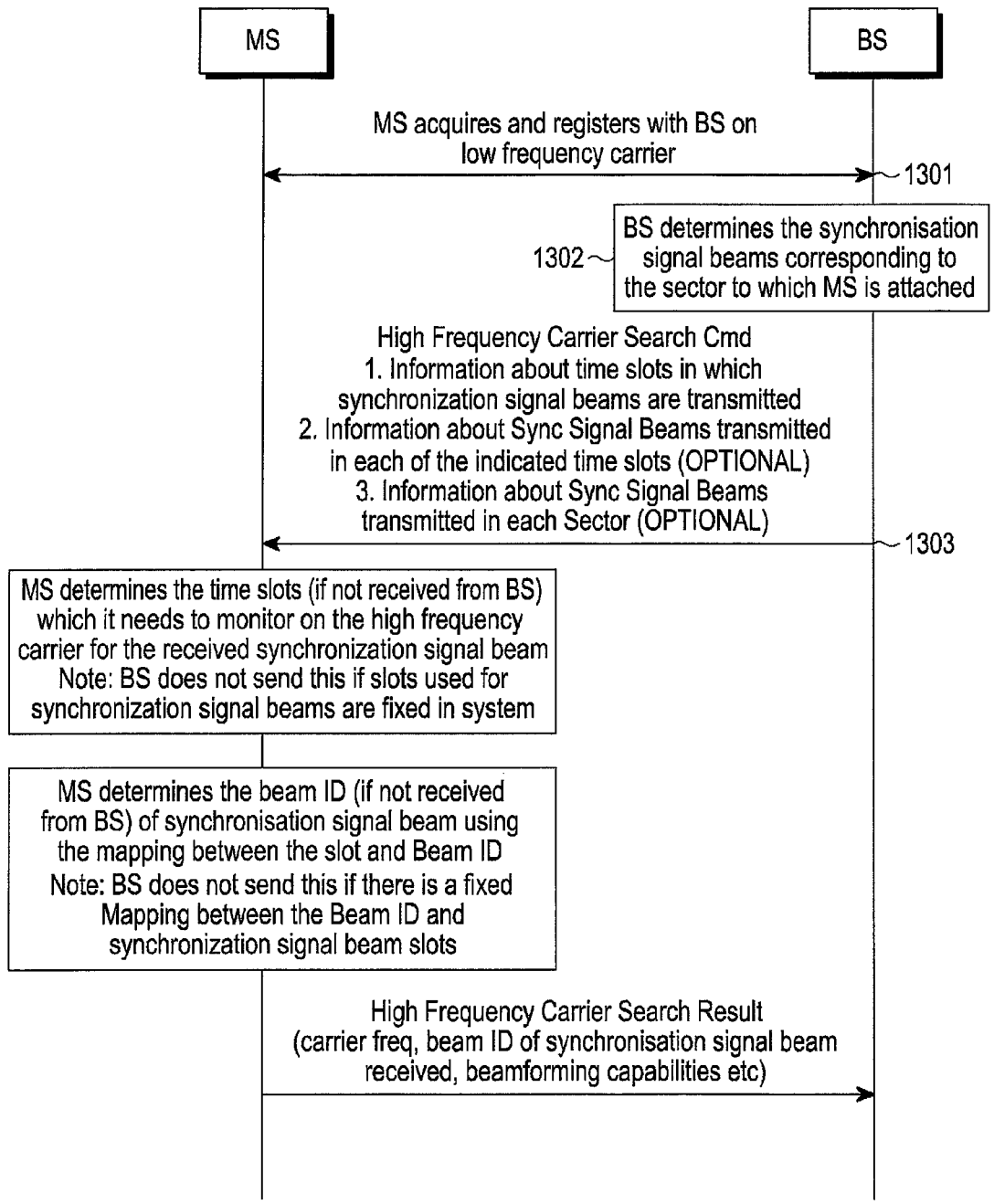
FIG. 13 is an example flow diagram of a method of acquiring a high frequency carrier in a communication network according to this disclosure.

FIG. 13 is an example flow diagram of a method of searching and acquiring a high frequency carrier according to this disclosure. In at least this embodiment, the MS can acquire and register with the BS on a low frequency carrier at step 1301. The BS can then determine synchronization beams corresponding to the sector to which MS is attached at step 1302 and can send a high frequency carrier search command to the MS at step 1303. The high frequency search command, can include but is not limited to, synchronization signal beams to search and a time slot of a high frequency carrier that the MS needs to monitor for receiving synchronization signals.

Further, a high frequency carrier search result can be provided from the MS to the BS. The search result can include, but is not limited to, a carrier frequency, a beam ID of a synchronization signal beam received, beamforming capabilities, and the like.

Figure 14:
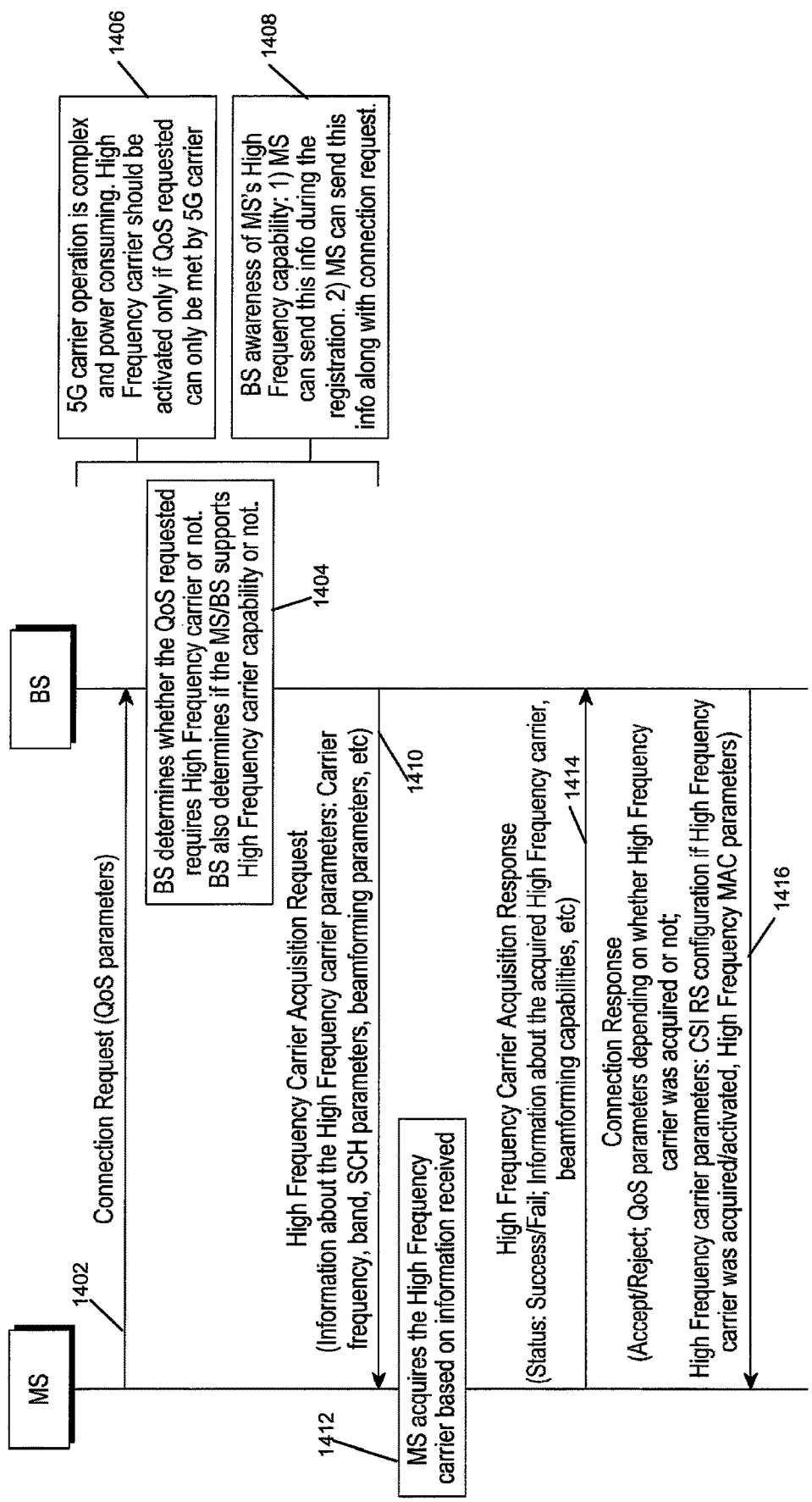
FIG. 14 is an example flow diagram of a method of activating a high frequency carrier according to this disclosure.
Figure 15:
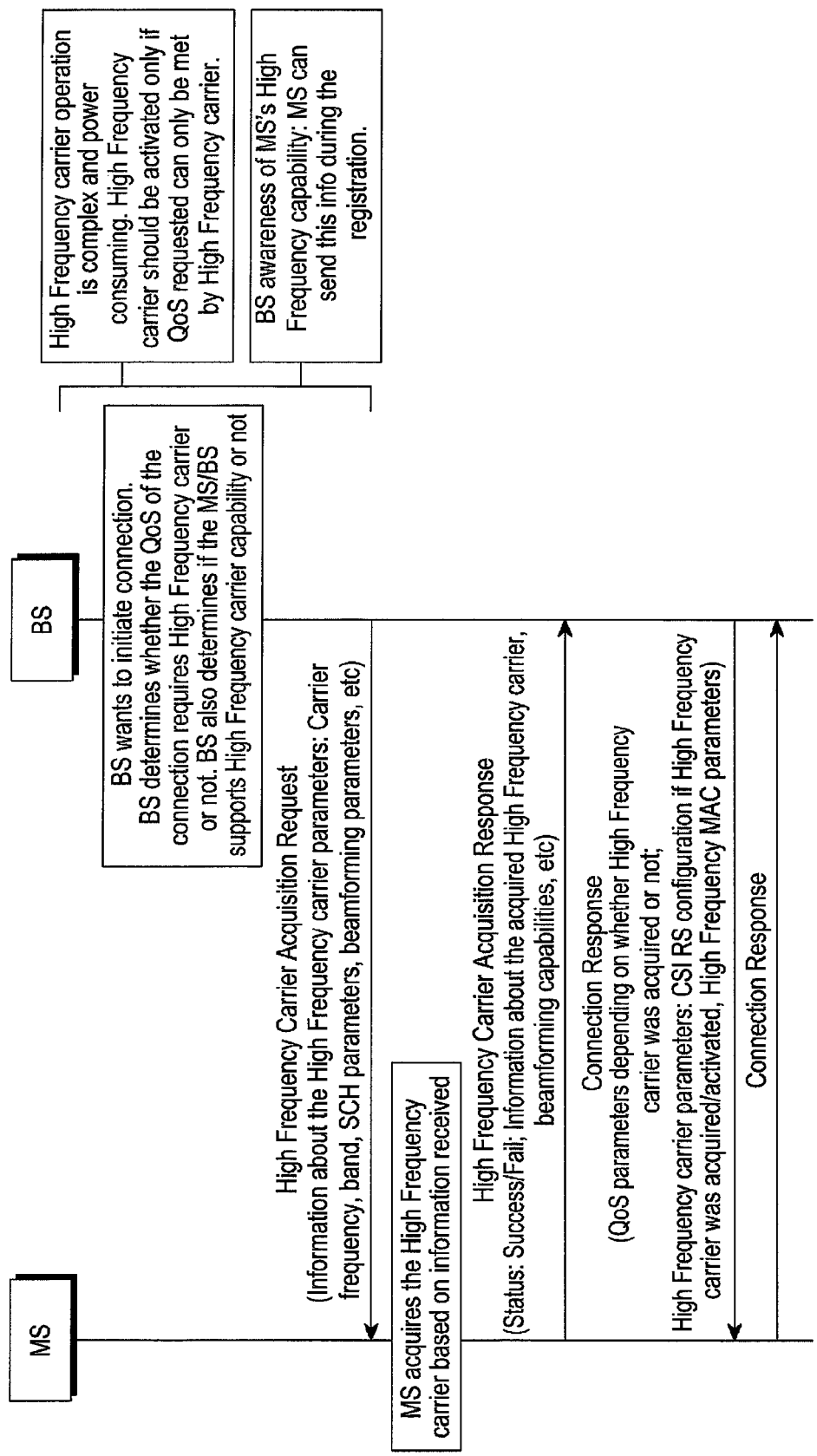
FIG. 15 is an example flow diagram of a method of activating a high frequency carrier according to this disclosure.

FIG. 14 is an example of triggering of the activation of a high frequency carrier according to this disclosure. The MS can initiate a connection and transmit a connection request with QoS parameters for the requested connection. The BS can determine whether the QoS requested requires a high frequency carrier (or 5G carrier) or not. The BS can also determine if the MS/BS supports 5G carrier capability or not. The 5G carrier operation can be complex and power consuming. The 5G carriers may be activated only if the QoS requested can only be met by the 5G carrier. The BS can be aware of MS's 5G capability in at least one of the following ways: 1) The MS can send this information during the registration. 2) The MS can send this information along with connection request. If the BS/MS can support 5G capability and QoS requested requires the 5G carrier then the BS can send the 5G carrier acquisition request message with information about the 5G carrier parameters such as a carrier frequency, a frequency band, beamforming parameters, and the like. The MS can acquire the 5G carrier based on information received from the BS and can send the 5G carrier acquisition response to the MS. On receiving the 5G carrier acquisition response, the BS can send a connection response to the MS. The BS can indicate if the connection request is accepted or not. If accepted, the BS can also indicate the QoS parameters depending on whether the 5G carrier was acquired or not. If the requested QoS required the 5G carrier and the 5G carrier was not acquired by MS, the BS can downgrade the QoS of connection or may reject the connection. An example of an activation of the 5G carrier when connection request is initiated by BS is illustrated in FIG. 15.

In an embodiment, the BS can always transmit the synchronization signal using beamforming. In an embodiment, the BS can transmit the synchronization signal beam(s) in a sector based on the MS location. If there is an MS attached to a sector of the BS on the low frequency carrier then only BS can transmit one or more synchronization signal beam of that sector. One or more synchronization signal beams in a neighbouring sector of the sector to which the MS is attached on low frequency carrier can also be transmitted on high frequency carrier.

In an embodiment, the BS can dynamically decide the synchronization signal slots for the beams based on a number of beams enabled for transmission from the BS. For example, consider 4 synchronization signal beams that can be used on a high frequency carrier. If all synchronization signal beams are switched on, beam 1, beam 2, beam 3 and Beam 4 can be transmitted in slots T1, T2, T3 and T4 respectively (T1: B1, T2: B2, T3: B3, T4: B4). If beam 2 and beam 3 are switched off as there are no MS in those sectors, the transmission slot of beam 4 can be changed from slot T4 to T2 (T1: B1, T2: B4, T3: No Tx, T4: No Tx)

The methods explained in this disclosure can also be used for searching a high frequency carrier of not only the BS to which the MS is attached but also of a neighboring BS.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method for communicating by an electronic device through a first cell and a second cell in a wireless communication system, the method comprising:
receiving, on the first cell, information related to one or more synchronization signals including information indicating one or more time intervals for receiving the one or more synchronization signals on the second cell by the electronic device and information indicating one or more beams through which the one or more synchronization signals are transmitted on the second cell, wherein the information indicating the one or more time intervals for receiving the one or more synchronization signals on the second cell comprises information related to a start subframe of a duration for receiving the one or more synchronization signals, the duration including at least one subframe;
measuring a synchronization signal on the second cell based on the information indicating the one or more time intervals and the information indicating the one or more beams through which the one or more synchronization signals are transmitted on the second cell; and
transmitting, to a base station (BS), information for identifying at least one beam related to the measured synchronization signal,
wherein a carrier frequency of the first cell is lower than a carrier frequency of the second cell.

2. The method of claim 1, wherein the information related to the one or more synchronization signals includes at least one of one or more identifications (IDs), one or more scrambling codes and one or more beam sequences of the one or more beams.

3. The method of claim 1, wherein when the one or more beams are received at a same time, the one or more beams are distinguished from each other based on the information related to the one or more synchronization signals.

4. The method of claim 1, wherein the information related to the one or more synchronization signals comprises an identification (ID) of a beam through which the synchronization signal is transmitted in each of the time intervals.

5. The method of claim 1, wherein identifications (IDs) of the one or more beams are identified by the electronic device based on the information related to one or more synchronization signals without reading a broadcast channel of the BS or without using descrambling codes used for transmitting the one or more beams.

6. The method of claim 1, further comprising receiving the information indicating one or more time intervals for receiving the one or more synchronization signals on the second cell, which is broadcast by the BS.

7. An electronic device for communicating through a first cell and a second cell in a wireless communication system, the electronic device comprising:
a transceiver; and
a controller coupled to the transceiver, wherein the controller is configured to:
receive, on the first cell, information related to one or more synchronization signals including information indicating one or more time intervals for receiving the one or more synchronization signals on the second cell by the electronic device and information indicating one or more beams through which the one or more synchronization signals are transmitted on the second cell, wherein the information indicating the one or more time intervals for receiving the one or more synchronization signals on the second cell comprises information related to a start subframe of a duration for receiving the one or more synchronization signals, the duration including at least one subframe,
measure a synchronization signal on the second cell based on the information indicating the one or more time intervals and the information indicating the one or more beams through which the one or more synchronization signals are transmitted on the second cell, and
transmit, to a base station (B S), information for identifying at least one beam related to the measured synchronization signal,
wherein a carrier frequency of the first cell is lower than a carrier frequency of the second cell.

8. The electronic device of claim 7, wherein the information related to the one or more synchronization signals includes at least one of one or more identifications (IDs), one or more scrambling codes and one or more beam sequences of the one or more beams.

9. The electronic device of claim 7, wherein when the one or more beams are received at a same time, the controller is configured to distinguish the one or more beams from each other based on the information related to the one or more synchronization signals.

10. The electronic device of claim 6, wherein the information related to the one or more synchronization signals comprises an identification (ID) of a beam through which the synchronization signal is transmitted in each of the time intervals.

11. The electronic device of claim 7, wherein identifications (IDs) of the one or more beams are identified by the electronic device based on the information related to one or more synchronization signals without reading a broadcast channel of the BS or without using descrambling codes used for transmitting the one or more beams.

12. The electronic device of claim 7, wherein the controller is further configured to receive the information indicating one or more time intervals for receiving the one or more synchronization signals on the second cell, which is broadcast by the BS.

13. A method for communicating with an electronic device by a base station (BS) in a wireless communication system, the method comprising:
transmitting, on a first cell of the BS, information related to one or more synchronization signals including information indicating one or more time intervals for receiving the one or more synchronization signals on a second cell by the electronic device and information indicating one or more beams through which the one or more synchronization signals are transmitted on the second cell, wherein the information indicating the one or more time intervals for receiving the one or more synchronization signals on the second cell comprises information related to a start subframe of a duration for receiving the one or more synchronization signals, the duration including at least one subframe, and wherein a synchronization signal transmitted on the second cell is measured by the electronic device based on the information indicating the one or more time intervals and the information for indicating the one or more beams; and
receiving, from the electronic device, information for identifying at least one beam related to the measured synchronization signal,
wherein a carrier frequency of the first cell is lower than a carrier frequency of the second cell.

14. The method of claim 13, wherein the information related to the one or more synchronization signals includes at least one of one or more identifications (IDs), one or more scrambling codes and one or more beam sequences of the one or more beams.

15. The method of claim 13, wherein when the one or more beams are transmitted at a same time, the one or more beams are distinguished by a mobile station (MS) from each other based on the information related to the one or more synchronization signals.

16. The method of claim 13, wherein the information related to the one or more synchronization signals comprises an identification (ID) of a beam through which the synchronization signal is transmitted in each of the time intervals.

17. The method of claim 13, wherein identifications (IDs) of the one or more beams are identified by the electronic device based on the information related to one or more synchronization signals without reading a broadcast channel of the BS or without using descrambling codes used for transmitting the one or more beams.

18. The method of claim 13, further comprising broadcasting the information indicating one or more time intervals for receiving the one or more synchronization signals on the second cell.

19. A base station (BS) for communicating with an electronic device in a wireless communication system, the BS comprising:
a transceiver; and
a controller coupled to the transceiver, wherein the controller is configured to:
transmit, on a first cell of the BS, information related to one or more synchronization signals including information indicating one or more time intervals for receiving the one or more synchronization signals on a second cell by the electronic device and information indicating one or more beams through which the one or more synchronization signals are transmitted on the second cell, wherein the information indicating the one or more time intervals for receiving the one or more synchronization signals on the second cell comprises information related to a start subframe of a duration for receiving the one or more synchronization signals, the duration including at least one subframe, and wherein a synchronization signal transmitted on the second cell is measured by the electronic device based on the information indicating the one or more time intervals and the information for indicating the one or more beams, and
receive, from the electronic device, information for identifying at least one beam related to the measured synchronization signal,
wherein a carrier frequency of the first cell is lower than a carrier frequency of the second cell.

20. The BS of claim 19, wherein the information related to the one or more synchronization signals includes at least one of one or more identifications (IDs), one or more scrambling codes and one or more beam sequences of the one or more beams.

21. The BS of claim 19, wherein when the one or more beams are transmitted at a same time, the one or more beams are distinguished by a mobile station from each other based on the information related to the one or more synchronization signals.

22. The BS of claim 19, wherein the information related to the one or more synchronization signals comprises an identification (ID) of a beam through which the synchronization signal is transmitted in each of the time intervals.

23. The BS of claim 19, wherein identifications (IDs) of the one or more beams are identified by the electronic device based on the information related to one or more synchronization signals without reading a broadcast channel of the BS or without using descrambling codes used for transmitting the one or more beams.

24. The BS of claim 19, wherein the controller is further configured to broadcast the information indicating one or more time intervals for receiving the one or more synchronization signals on the second cell.

* * * * *